US012210933B2

(12) United States Patent
Mohseni et al.

(10) Patent No.: US 12,210,933 B2
(45) Date of Patent: *Jan. 28, 2025

(54) QUANTUM STATISTIC MACHINE

(71) Applicant: Google LLC, Mountain View, CA (US)

(72) Inventors: Masoud Mohseni, Calabasas, CA (US); Hartmut Neven, Malibu, CA (US)

(73) Assignee: Google LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/404,365

(22) Filed: Jan. 4, 2024

(65) Prior Publication Data

US 2024/0412086 A1  Dec. 12, 2024

Related U.S. Application Data

(63) Continuation of application No. 17/678,897, filed on Feb. 23, 2022, now Pat. No. 11,900,215, which is a
(Continued)

(51) Int. Cl.
*G06N 10/00* (2022.01)
*G06N 20/00* (2019.01)

(52) U.S. Cl.
CPC .............. *G06N 10/00* (2019.01); *G06N 20/00* (2019.01)

(58) Field of Classification Search
CPC ........ G06N 10/00; G06N 10/40; G06N 10/60; G06N 20/00; G06N 99/002; G06N 99/005; G06N 3/0445; G06N 3/082
(Continued)

(56) References Cited

U.S. PATENT DOCUMENTS

2008/0176750 A1* 7/2008 Rose ...................... G06N 10/00
505/170
2014/0245249 A1* 8/2014 Macready .............. B82Y 10/00
716/132
(Continued)

FOREIGN PATENT DOCUMENTS

CN   102883548   1/2013
CN   104392143   3/2015
(Continued)

OTHER PUBLICATIONS

Dorband, "A Boltzmann Machine Implementation for the D-Wave", 2015 12th International Conference on Information Technology—New Generations. (Previously supplied). (Year: 2015).*
(Continued)

*Primary Examiner* — Dave Misir
(74) *Attorney, Agent, or Firm* — Fish & Richardson P.C.

(57) ABSTRACT

Methods, systems, and apparatus, including computer programs encoded on computer storage media, for constructing and programming quantum hardware for machine learning processes. A Quantum Statistic Machine (QSM) is described, consisting of three distinct classes of strongly interacting degrees of freedom including visible, hidden and control quantum subspaces or subsystems. The QSM is defined with a programmable non-equilibrium ergodic open quantum Markov chain with a unique attracting steady state in the space of density operators. The solution of an information processing task, such as a statistical inference or optimization task, can be encoded into the quantum statistics of an attracting steady state, where quantum inference is performed by minimizing the energy of a real or fictitious quantum Hamiltonian. The couplings of the QSM between the visible and hidden nodes may be trained to solve hard optimization or inference tasks.

19 Claims, 10 Drawing Sheets

Related U.S. Application Data continuation of application No. 16/067,560, filed as application No. PCT/US2016/068308 on Dec. 22, 2016, now Pat. No. 11,288,585.

(60) Provisional application No. 62/273,282, filed on Dec. 30, 2015.

(58) Field of Classification Search
USPC .......................................................... 706/25
See application file for complete search history.

(56) References Cited

U.S. PATENT DOCUMENTS

| | | | | |
|---|---|---|---|---|
| 2015/0317558 | A1* | 11/2015 | Adachi | G06N 3/06 706/19 |
| 2015/0332164 | A1* | 11/2015 | Maassen van den Brink | G06N 5/003 709/217 |
| 2016/0042294 | A1* | 2/2016 | Macready | G06N 10/00 706/10 |
| 2016/0267032 | A1* | 9/2016 | Rigetti | G06F 13/4068 |
| 2016/0321559 | A1* | 11/2016 | Rose | G06N 10/00 |
| 2016/0335558 | A1* | 11/2016 | Bunyk | G06N 10/00 |
| 2017/0230050 | A1* | 8/2017 | Rigetti | G06N 10/00 |
| 2017/0255872 | A1* | 9/2017 | Hamze | G06N 3/12 |
| 2017/0364796 | A1* | 12/2017 | Wiebe | G06N 3/0445 |

FOREIGN PATENT DOCUMENTS

| | | |
|---|---|---|
| CN | 105960650 | 9/2016 |
| WO | WO 2015/103372 | 7/2015 |

OTHER PUBLICATIONS

"Dissipative Quantum Maps", Springer-Verlag Berlin Heidelberg 2001. (Previously supplied). (Year: 2001).*

Rabani, "Energy Dissipation in Nonlinear Systems Coupled to a Bath: On the Use of Perturbative Maps", J. Phys. Chem. A 1998, 102, 9380-9389. (Year: 1998).*

Braun, "Dissipative Quantum Maps." Dissipative Quantum Chaos and Decoherence 2001, 63-73.

Dorband, "A Boltzmann Machine Implementation for the D-Wave", 2015 12th International Conference on Information Technology—New Generations, 2015, 703-707.

Community.dur.ac.uk [online], "Information Theory and Machine Learning," Dissertation, Apr. 25, 2008 [retrieved on Mar. 28, 2017] Retrieved from Internet: URL<https://community.dur.ac.uk/d.p.kaye/dissertation/dissertation.pdf> 64 pages.

* cited by examiner

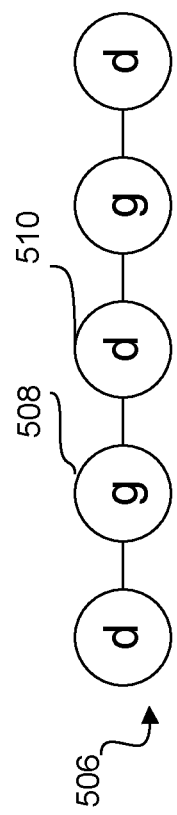
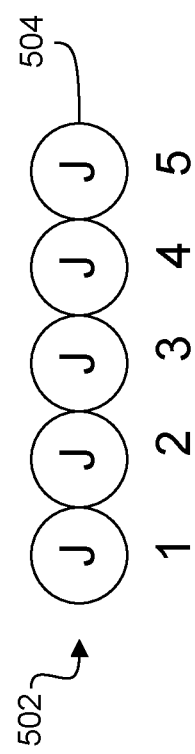
FIG. 5B
FIG. 5A

QUANTUM STATISTIC MACHINE

CROSS-REFERENCE TO RELATED APPLICATIONS

This application is a continuation application of, and claims priority to, U.S. patent application Ser. No. 17/678,897, filed on Feb. 23, 2022, which is a continuation application of, and claims priority to, U.S. patent application Ser. No. 16/067,560, now U.S. Pat. No. 11,288,585, filed on Jun. 29, 2018, which application is a national phase application under 35 U.S.C. § 371 of PCT International Application No. PCT/US2016/068308, filed Dec. 22, 2016, which claims the benefit of U.S. Provisional Patent Application Ser. No. 62/273,282, filed on Dec. 30, 2015. The entire contents of the foregoing applications are hereby incorporated by reference.

BACKGROUND

This specification relates to constructing and programming quantum hardware for machine learning processes.

SUMMARY

Artificial intelligence tasks can be translated into machine learning optimization problems. To perform an artificial intelligence task, an information processing model exploiting dissipative quantum dynamical maps for generating desired probability distributions for hard optimization and inference tasks may be trained.

The information processing model may provide a statistical description of some input patterns that are consistent with the model's internal state and its surrounding noisy world. The model may develop a steady internal state by being sufficiently exposed to training data such that it can make its own predictions about the statistical behavior of other patterns not included in the training data. A learning strategy for encoding, programming and machine readout may be devised and may be used to solve hard combinatory optimization and inference tasks with desired accuracy.

Quantum processors inevitably live in a mixed quantum-classical world due to quantum fluctuations induced by environmental interactions and the system's intrinsic control errors. The structure and dynamics of such processors may be extremely complicated such that it is virtually impossible to solve the equations of motion capturing their behavior either analytically or numerically using known algorithms. Furthermore, quantum processors usually require additional quantum error correction procedures that can be extremely demanding. In particular, analog quantum processors, such as quantum annealing processors and adiabatic quantum computation architectures, that encode the solution to a given hard optimization or inference task into an equilibrium ground state given by a Boltzmann distribution with typically small minimum gap struggle with scalability.

The information processing model comprises quantum hardware that is constructed and programmed in order to perform quantum computation without requiring extremely demanding quantum error correction procedures. The quantum hardware provides a realistic, near-term engineering approach to quantum computation that does not suffer from known scalability and realization issues. The quantum hardware provides a robust encoding, guaranteeing dynamical robustness with respect to perturbations and enhances performance with respect to time complexity. In particular, the quantum hardware constructs non-information bearing auxiliary degrees of freedom that may be used to perform dissipative quantum engineering without bath engineering.

The details of one or more embodiments of the subject matter of this specification are set forth in the accompanying drawings and the description below. Other features, aspects, and advantages of the subject matter will be apparent from the description, the drawings, and the claims.

DESCRIPTION OF DRAWINGS

FIG. 5A is a schematic diagram showing a one-dimensional chain of qubits in a quantum processor for performing a quantum inference process with strong quantum plasticity without introducing auxiliary qubits.

FIG. 5B is a schematic diagram showing a one-dimensional chain of qubits in a quantum processor for performing a quantum inference process with strong quantum plasticity.

DETAILED DESCRIPTION

Overview

Figure 1:
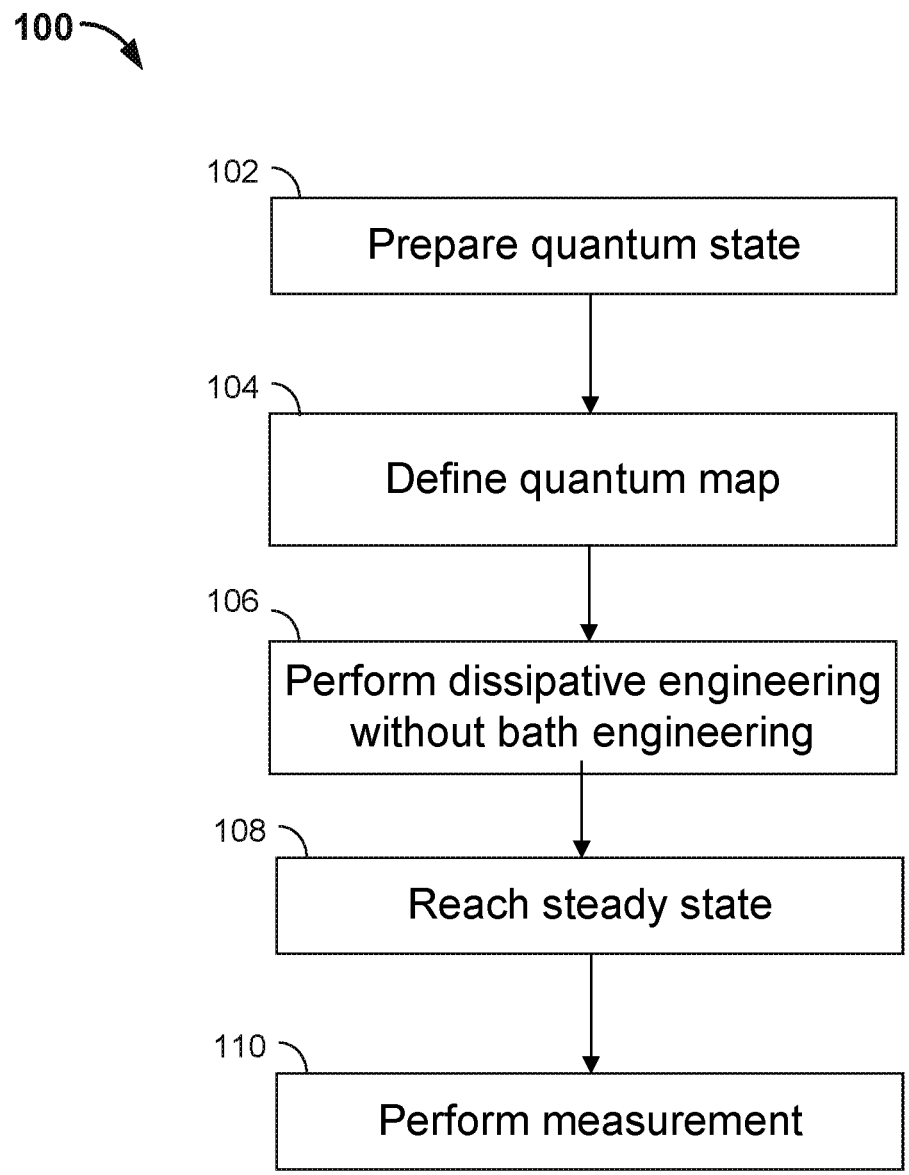
FIG. 1 is a flow diagram of an example iteration for obtaining a solution to a hard optimization or inference task.

Machine learning and statistical modeling can be used to encode dependencies between variables in learning models, which can in turn be used to infer values of unknown variables given the values of known variables. Energy-based learning models may capture such dependencies by associating a scalar energy to each configuration of variables. In a statistical inference stage, certain values of observed variables may be clamped and configurations of the remaining variables that minimize the scalar energy are found. Learning may then consist of finding an energy function in which observed configurations, or correct values, of variables are assigned lower energies than unobserved, or incorrect, configurations. A loss functional may be used to measure the quality of the available energy functions.

As an example, Boltzmann machines can be used to learn probability distributions over a set of inputs. The Boltzmann machine is a type of neural network comprising hidden and visible nodes that are connected with weighted connections. During a learning process, training data may be provided to the network and a learning rule may be followed to update the connection weights. The learning process involves repeatedly updating until the network reaches an equilibrium state. The Boltzmann machine has a scalar energy value associated with each state of the network, and the equilibrium state may be associated to a local minimum in the energy function.

The information processing model and corresponding quantum hardware of this specification can be considered a generalization to the quantum regime and non-equilibrium dynamics of such energy-based models of learning, e.g. the Boltzmann machine. The model defines a Quantum Statistic Machine ("QSM") that may exploit dissipative quantum dynamical maps for solving hard optimization and inference tasks, for example by generating desired probability distributions.

The QSM consists of three distinct classes of strongly interacting degrees of freedom including visible quantum subspaces, hidden quantum subspaces and control quantum subspaces or subsystems. Each class of strongly interacting degrees of freedom may be referred to as a class of qubits or nodes. The QSM may be defined with a programmable non-equilibrium ergodic open quantum Markov chain with a unique attracting steady state in the space of density operators. The solution of an information processing task, such as a statistical inference or optimization task, can be encoded into the quantum statistics of an attracting steady state, where quantum inference may be performed by minimizing the energy of a real or fictitious quantum Hamiltonian. The QSM may be constructed such that the dynamics of the control degrees of freedom ensure that the QSM approaches an effective steady state in a desired finite mixing time t without access to any bath degrees of freedom that is the control degrees of freedom perform dissipative quantum engineering without bath engineering. All statistical properties of the state may be deduced with a desired accuracy $\delta$. Furthermore, the couplings of the QSM between the visible and hidden nodes may be trained to solve hard optimization or inference tasks. For example, the QSM couplings may be trained such that the quantum statistics of the attracting steady state, associated with a set of quantum observables over the visible nodes, sample an arbitrary probability distribution function with desired accuracy E.

Analogous to classical machine learning, quantum inference is an important process in QSM learning. Quantum inference may involve clamping the values, or outcomes, of a set of quantum observables and finding configurations of the remaining variables that lead to a low-rank attracting steady state of the quantum Hamiltonian system. These low-rank steady states may be considered as minimized energy functions that represent the ground state of a real or fictitious Hamiltonian system in equilibrium or non-equilibrium regimes respectively.

The QSM introduces the concept of quantum plasticity as a quantum counterpart of biologically-inspired post-von Neumann architectures known as Neuromorphic Computing architectures that can become plastic or actual biological neural networks such as those in the neocortex which are known to be plastic. The QSM may be implemented in quantum hardware to achieve quantum plasticity in a quantum processor.

Outline of QSM Algorithm

To obtain a solution for a given hard optimization or inference task, the QSM may implement iterative quantum inference and quantum machine learning and unlearning algorithms. For example, in some implementations the QSM may perform several iterations to sample a desired probability distribution. FIG. 1 shows a flow diagram of a single iteration of an example process 100 for obtaining a solution to a hard optimization or inference task. The example process 100 may be performed multiple times in order to obtain a solution. The quantum inference task may be translated into a quantum machine learning problem, which may be represented in a machine-readable form.

The quantum system is prepared in a random quantum state (step 102) comprising the tensor product of a QSM density operator and thermal bath degrees of freedom and may be given by equation (1) below.

$$\rho_{tot}(0) = \rho_{VHG}(0) \otimes \rho_B(0) \tag{1}$$

In equation (1) $\rho_{VHG}(0)$ is a random state of visible v, hidden h and control g nodes and $\rho_B(0)$ is a thermal state of the thermal bath at the initial time. In some implementations, $\rho_{VHG}(0)$ is an entangled state.

In some implementations, the QSM may rely on one or more auxiliary control nodes that are Quantum Governor (QG) nodes. The QG nodes may represent the set of all non-information bearing quantum degrees of freedom and manage the interaction of the information bearing degrees of freedom with the thermal bath. For a time-independent Hamiltonian, using QG nodes as control nodes may increase the interaction between the QSM system and bath in a controlled fashion to create robust steady states and reduce the required mixing time. For a time-dependent Hamiltonian, using QG nodes as control nodes may be further considered as an error-correction strategy. The QG nodes may enable the performance of dissipative quantum engineering without bath engineering, as will be described further below with reference to step (106).

The quantum system evolves under the action of a linear quantum dynamical map. In some implementations, the linear quantum dynamical map may be a member of a subset of linear quantum dynamical maps that are completely positive and trace preserving, under the assumption that the initial system and bath are separable. In other implementations, the QSM can be generalized to evolve under the action of a more general linear Hermitian map, since a general linear map can be constructed from the subtraction of two completely positive quantum maps. The quantum map may be induced by a Hamiltonian of the visible, hidden and QG nodes and their interactions with the thermal bath (step 104). The total Hamiltonian for the QSM interacting with the thermal bath may be given by equation (2) below.

$$H_{tot} = H_{VHG} + H_B + H_{VHG-B} \tag{2}$$

In general, the Hamiltonian of the QSM, thermal bath and their interactions may be time-dependent. The evolution of the quantum state of the QSM may be expressed as given by equation (3) below.

$$\rho_{VHG}(t) = Tr_B[U_{tot}(t)\rho_{tot}(t)U_{tot}^\dagger(t)] \tag{3}$$

In equation (3) the unitary operator can be expressed as $U_{tot}(t) = T_\leftarrow \exp[-i\int_o^\tau H_{tot}(t)dt]$ or $U_{tot}(t) = \exp[-itH_{tot}]$ depending on, for example, whether the Hamiltonian of the QSM and its interaction with the thermal bath is time-dependent or time-independent, respectively. Assuming that the system and bath are initially separable, the effective dynamics for the QSM may be expressed as a quantum trace-preserving dynamical map, given by equation (4) below.

$$M_\tau(\rho_{VHG}) = \rho_{VHG}(\tau) = \sum_k A_k(\tau)\rho_{VHG}A_k^\dagger(\tau) \qquad (4)$$

In equation (4) $A_{k=\{i,j\}}(\tau)=\sqrt{\eta j}\langle e_i|U_{tot}(\tau)|e_j\rangle$ and $\Sigma_k A_k^\dagger(\tau) A_k(\tau)=I$. The set of output states formed by the quantum maps may be closed under convex combination and multiplication.

The quantum state evolves under the action of the quantum map. The quantum dynamics may be engineered with the QG degrees of freedom such that the quantum system performs dissipative engineering without bath engineering (step 106). The engineering environment may be facilitated by the QG nodes and the corresponding control parameters are the QG interaction Hamiltonians.

After a finite mixing time, the quantum state arrives at a desired attracting steady state $\rho_{ss}$ (step 106). For any non-ergodic or weakly ergodic quantum dynamical map acting on the information bearing degrees of freedom, there may be an auxiliary system comprising auxiliary nodes such that the quantum dynamics of the information bearing degrees of freedom becomes strongly ergodic. As described above in relation to step 102, the QSM may be constructed to include a class of Quantum Governor auxiliary nodes comprising the non-information bearing degrees of freedom. In addition to managing the interaction of the information bearing degrees of freedom with the thermal bath, the Quantum Governor modes may ensure that the quantum system containing the information bearing degrees of freedom is strongly ergodic. Furthermore, for any programmable many-body open quantum system comprising information bearing degrees of freedom with one or more steady states that is interacting with a controllable but well-characterised thermal bath, the Quantum Governor auxiliary system may generate a unique programmable quantum attractor in the information bearing degrees of freedom system. Therefore, by construction, the QSM may have a unique attracting steady state $\rho_{ss}$ that can always be reached asymptotically as $$\lim_{T\to\infty}\|M_T(\rho_{VHG})-\rho_{ss}\|_1=0;\ \forall\ \rho_{vhg}\in H_{QSM}.$$

The existence and uniqueness of the steady state may enable the introduction of an energy-based model of learning in the quantum regime. The solution to the optimization or statistical inference problem may be encoded into the attracting steady state of the QSM. The attracting steady state may coincide with a ground state of a corresponding fictitious Hamiltonian, which may be used to encode the solution of the problem. The fictitious Hamiltonian and corresponding partition function for the non-equilibrium system may be defined using a quantum thermodynamical approach. The explicit relation for the fictitious Hamiltonian can be written as given by equation (5) below.

$$H^*_{VHG}(\tau) = -\frac{1}{\beta}\text{Ln}\left[\frac{Tr_B\exp(-\beta(H_{VHG}(\tau)+H_B+H_{VHG-B}))}{Tr_B\exp(-\beta H_B)}\right] \qquad (5)$$

The density operator $\rho_{ss}=\rho_{VHG}(\tau)$ can be recovered using the relation given above.

The above relations, e.g., equations (1)-(5), may provide the QSM with scalability, since any quantum measurement on the QSM is sampling from the ground state of the fictitious Hamiltonian and not the true thermal states of $H_{VHG}(\tau)$. In contrast, quantum annealers or adiabatic quantum computers rely on encoding and readout in the ground state of a physical free Hamiltonian or any other form of thermal distribution of its eigenstates. In particular, analog quantum processors encode the solution of the inference task into an equilibrium ground state given by the Boltzmann distribution at finite temperatures with a typically exponentially small minimum gap. Increasing the size of the inference problems considered, and inevitably the size of the quantum processor required to solve the problem, decreases the gap such that analog quantum processors do not satisfy the required conditions for scalability.

A quantum measurement, in its most general form given by a positive operator valued measurement (POVM), may be performed on the unique attracting steady state (step 108). The measurement outcome provides the solution to the hard optimization or inference problem that may be encoded into the unique attracting steady state. The measurement outcome may be in machine-readable form and correspond to an effective energy value of the ground state of the fictitious Hamiltonian $H^*_{VHG}(\tau)$.

During the process 100, the quantum system may perform Hamiltonian evolution at finite times. The ground state fidelity may therefore be less than unity and the process may have to be repeated in order to achieve reasonable statistical information about the solution. In some implementations the quantum system may therefore repeat the above process in order to obtain a final solution to the hard optimization or inference task, or in order to sample a desired probability distribution.

The QSM can be trained on a set of training data in order to determine trained values of system parameters. Once the QSM has been trained, the QSM may receive a new hard optimization or inference task and process system input using the trained system parameters to obtain a solution to the hard optimization or inference task. During the training process, the QSM may implement iterative quantum inference and quantum machine learning and unlearning algorithms.

Figure 2A:
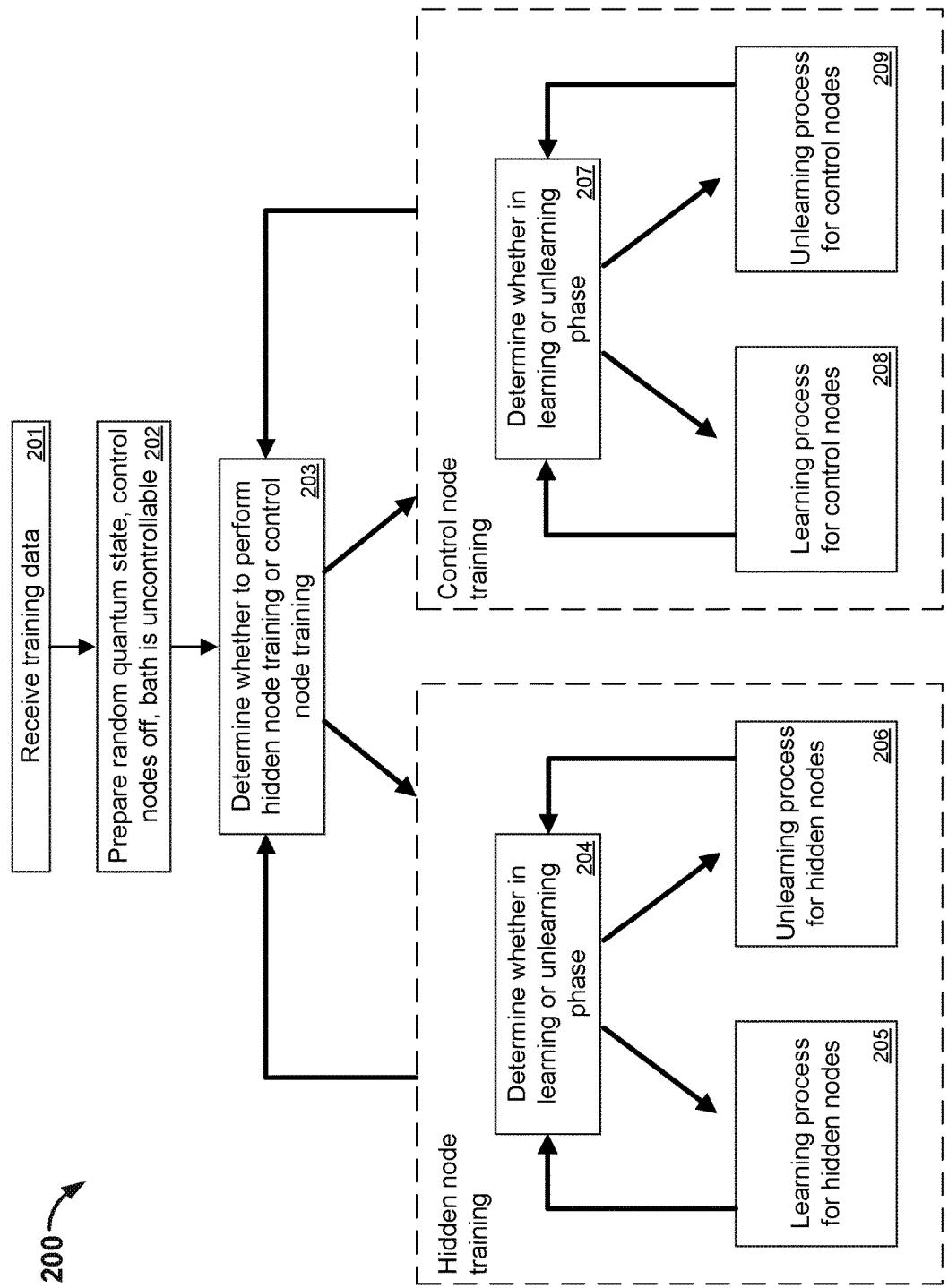
FIG. 2A is a flow diagram of an example process for training the QSM with weak plasticity to obtain a solution to a hard optimization or inference task.

FIG. 2A shows a flow diagram of an example process 200 for training the QSM with weak plasticity to obtain a solution to a hard optimization or inference task. The process is described as being performed by a classical processor, such as a classical computer, or a quantum processor, or a combination thereof. For example, the quantum hardware 400 of FIG. 4A below can perform the process 200.

The process 200 can be considered a self-organized procedure which includes two separate iterative processes for training the hidden nodes and control nodes, respectively, wherein each iterative process consists of two alternating phases of learning and unlearning. The states of the input quantum nodes, output quantum nodes, hidden quantum nodes and control quantum nodes during a hidden node training process and a control node training process are detailed in FIGS. 2B-2E and described in the following table.

|  | Hidden node training | Control node training |
|---|---|---|
| Learning | 1<br>Input/output nodes: CLAMPED<br>Hidden nodes: UNCLAMPED<br>Control nodes: OFF | 3<br>Input/output nodes: CLAMPED<br>Hidden nodes: CLAMPED<br>Control nodes: UNCLAMPED |
| Unlearning | 2<br>Input/output nodes: UNCLAMPED<br>Hidden nodes: UNCLAMPED<br>Control nodes: OFF | 4<br>Input/output nodes: UNCLAMPED<br>Hidden nodes: CLAMPED<br>Control nodes: UNCLAMPED |

The quantum system receives training data (step 201). The training data may include input training data and output training data. In some implementations the training data may be some known probability distribution of input data. The QSM may be exposed to the training data in order to learn how to predict the statistical behavior of additional patterns not included in the training data.

The quantum system is prepared in a random quantum state (step 202) comprising the tensor product of a QSM density operator and thermal bath degrees of freedom as given by equation (1) above. In equation (1), $\rho_{VHG}(0)$ is a random state of visible v, hidden h and control g nodes and $\rho_B(0)$ is a thermal state of the thermal bath at the initial time. In some implementations, $\rho_{VHG}(0)$ is an entangled state. At state preparation the control nodes may be off and the thermal bath may be uncontrollable.

In some implementations, the control nodes are Quantum Governor (QG) nodes. The QG nodes may represent the set of all non-information bearing quantum degrees of freedom and manage the interaction of the information bearing degrees of freedom with the thermal bath. For a time-independent Hamiltonian, using QG nodes as control nodes may increase the interaction between the QSM system and bath in a controlled fashion to create robust steady states and reduce the required mixing time. For a time-dependent Hamiltonian, using QG nodes as control nodes may be further considered an error-correction strategy. The QG nodes may enable the performance of dissipative quantum engineering without bath engineering.

The QSM training process may be an iterative process including two separate processes for training the hidden nodes and control nodes, respectively, wherein each iterative process consists of two alternating phases of learning and unlearning. The quantum system therefore determines whether to enter a hidden node training phase or a control node training phase (step 203). The quantum system may enter a control node training phase if the previous iteration included a hidden node training phase, and may enter an hidden node training phase if the previous iteration included a control node training phase. For clarity, the process 200 will be described below as first determining to enter a hidden node training phase at step 203.

The quantum system enters a hidden node training phase wherein the hidden nodes of the QSM are trained to iteratively capture high-level dependencies between the system variables for all or a subset of the received set of training data. During the hidden node training phase the control node couplings may be turned off, i.e. the control nodes have no interaction with the logical nodes. The hidden node training phase can be understood as an approximate diagonalization of the quantum Markov chain representing the dynamics of the visible and hidden nodes. The hidden node training phase can also be considered as a quantum correspondence to classical clustering techniques such a principal component analysis or spectral clustering.

Upon determining to enter a hidden node training phase at step 203, the system determines whether to enter a learning phase or unlearning phase for the hidden nodes (step 204). In some implementations, the quantum system may enter a learning phase if the previous iteration included an unlearning phase, and will enter an unlearning phase if the previous iteration included a learning phase. For clarity, the process 200 will be described below as first determining to enter a learning phase at step 204.

The quantum system performs a learning process for the hidden nodes (step 205). The learning process for training hidden nodes is described in more detail with reference to FIG. 2B below.

The quantum system performs an unlearning process for the hidden nodes (step 206). The unlearning process for training hidden nodes is described in more detail with reference to FIG. 2C below.

The quantum system may perform one or more iterations of the learning process for the hidden nodes and the unlearning process for the hidden nodes (steps 205 and 206) for temporary training of the hidden nodes. After temporary training of the hidden nodes, the system may determine to enter a control node training phase at step 203.

The quantum system may enter a control node training phase wherein the control nodes of the QSM are trained, and the processor may be allowed to adapt itself to manipulate environmental fluctuations which were ignored in the hidden node training phase. The control node training phase can be understood, mathematically, as a phase whereby the control nodes adjust themselves to create an optimal overlap between invariant subspaces that are otherwise orthogonal and lead to a freeze out of the quantum processor.

Upon determining to enter a control node training phase at step 203, the system determines whether to enter a learning phase or unlearning phase for the control nodes (step 207). In some implementations, the quantum system may enter a learning phase if the previous iteration included an unlearning phase, and may enter an unlearning phase if the previous iteration included a learning phase. For clarity, the process 200 will be described below as first determining to enter a learning phase at step 207.

The quantum system performs a learning process for the control nodes (step 208). The learning process for training control nodes is described in more detail with reference to FIG. 2D below.

The quantum system performs an unlearning process for the control nodes (step 209). The unlearning process for training control nodes is described in more detail with reference to FIG. 2E below.

The quantum system may perform one or more iterations of the learning process for the control nodes and the unlearning process for the control nodes (steps 208 and 209) for temporary training of the control nodes. After temporary training of the control nodes, the system may determine to enter a hidden node training phase at step 203.

The process 200 for training the QSM with weak plasticity can be performed iteratively to improve the performance of the QSM. The process 200 terminates when the quantum system has exhausted its training data resources. For example, when sampling from a probability distribution function (PDF), the process may terminate when the sampled PDF obtained may be determined to be within a given distance to the ideal PDF using a standard measure, such as a Chi-square divergence or relative entropy.

Figure 2B:
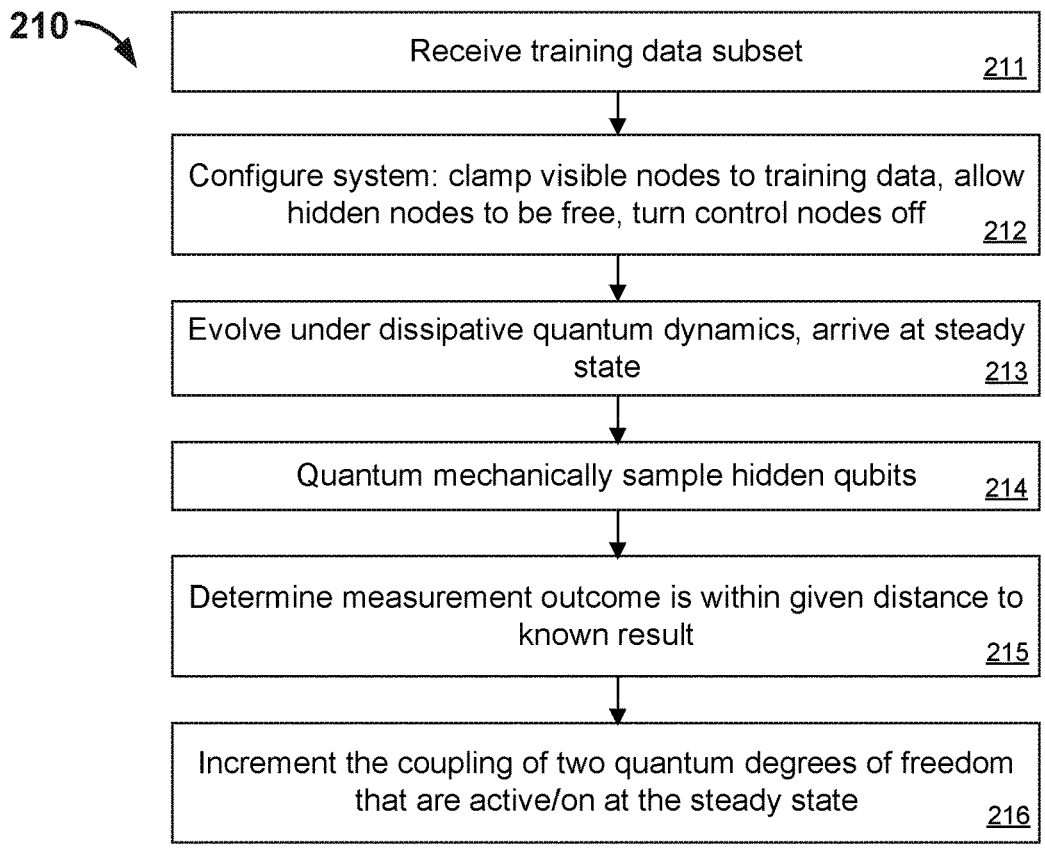
FIG. 2B is a flow diagram of an example learning process for training the hidden nodes of a QSM with weak plasticity.

FIG. 2B shows a flow diagram of an example learning process 210 for training the hidden nodes of a QSM with weak plasticity. The process is described as being performed by a classical processor, such as a classical computer, or a quantum processor, or a combination thereof. For example, the quantum hardware 400 of FIG. 4A below can perform the process 210.

The quantum system receives a subset of the training data provided to the system in step 201 with reference to FIG. 2A (step 211).

The quantum system configures the visible, hidden and control nodes (step 212). The visible input and output nodes may be clamped to the subset of training data, whilst the hidden nodes are unclamped and are allowed to adjust themselves to satisfy the data structure given their environmental interactions. The control node couplings are turned off.

The quantum system allows the configured quantum state to evolve under the action of a linear quantum dynamical map induced by a Hamiltonian of the visible, hidden and QG nodes and their interactions with the thermal bath (step 213). The total Hamiltonian for the QSM interacting with the thermal bath may be given by equation (2) above. In general, the Hamiltonian of the QSM, thermal bath and their interactions can be time-dependent. The evolution of the quantum state of the QSM may be given by equation (3) above. The effective dynamics for the QSM can be expressed as a quantum trace-preserving dynamical map, for example given by equation (4) above.

After a finite mixing time, the quantum state arrives at a desired attracting steady state $\rho_{ss}$. As described above in relation to step 108 of FIG. 1 by construction the QSM may have a unique attracting steady state $\rho_{ss}$ that may be reached asymptotically as $$\lim_{T \to \infty} \|M_T(\rho_{VHG}) - \rho_{ss}\|_1 = 0; \forall \rho_{vhg} \in H_{QSM}.$$

The quantum system quantum mechanically samples the hidden nodes (step 214). A quantum measurement, in its most general form given by a positive operator valued measurement (POVM), may be performed on the unique attracting steady state.

The quantum system may determine that the measurement outcome is within a given distance to the known result (step 215). The measurement outcomes may be post-processed and tested using statistical techniques and measures such as Chi-squared test and relative entropy. For example, the desired accuracy of the measurement outcome may be verified.

The quantum system increments the coupling of two quantum degrees of freedom that are active, or on, at the steady state (step 216).

Figure 2C:
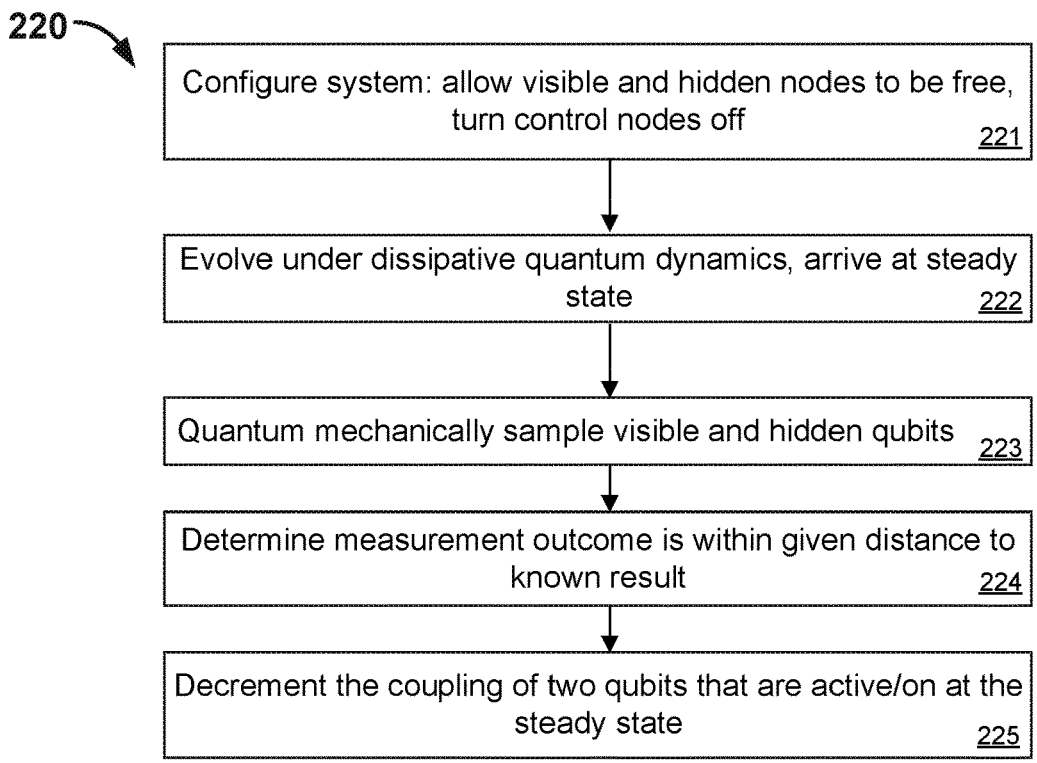
FIG. 2C is a flow diagram of an example unlearning process for training the hidden nodes of a QSM with weak plasticity.

FIG. 2C shows a flow diagram of an example unlearning process 220 for training the hidden nodes of a QSM with weak plasticity. The process is described as being performed by a classical processor, such as a classical computer, or a quantum processor, or a combination thereof. For example, the quantum hardware 400 of FIG. 4A below can perform the process 220.

The quantum system configures the visible, hidden and control nodes (step 221). The visible input and output nodes and the hidden nodes may be unclamped and allowed to adjust themselves to satisfy the data structure given their environmental interactions. This step may be considered as a "dreaming" phase. The control node couplings may be turned off.

The quantum system allows the configured quantum state to evolve under the action of a linear quantum dynamical map induced by a Hamiltonian of the visible, hidden and QG nodes and their interactions with the thermal bath (step 222). The total Hamiltonian for the QSM interacting with the thermal bath may be given by equation (2) above. In general, the Hamiltonian of the QSM, thermal bath and their interactions can be time-dependent. The evolution of the quantum state of the QSM may be given by equation (3) above. The effective dynamics for the QSM can be expressed as a quantum trace-preserving dynamical map, given by equation (4) above.

After a finite mixing time, the quantum state arrives at a desired attracting steady state $\rho_{ss}$. As described above in relation to step 108 of FIG. 1 by construction the QSM may have a unique attracting steady state $\rho_{ss}$ that may be reached asymptotically as $$\lim_{T \to \infty} \|M_T(\rho_{VHG}) - \rho_{ss}\|_1 = 0; \forall \rho_{vhg} \in H_{QSM}.$$

The quantum system quantum mechanically samples the visible input and output and hidden nodes (step 223). A quantum measurement, in its most general form given by a positive operator valued measurement (POVM), may be performed on the unique attracting steady state.

The quantum system may determine that the measurement outcome is within a given distance to the known result (step 224). The measurement outcomes may be post-processed and tested using statistical techniques and measures such as Chi-squared test and relative entropy. For example, the desired accuracy of the measurement outcome may be verified.

The quantum system decrements the coupling of two quantum degrees of freedom that are active, or on, at the steady state (step 225).

The unlearning phase for the hidden node training may lead to robustness with respect to both data noise (pollution in the data) and device noise.

Figure 2D:
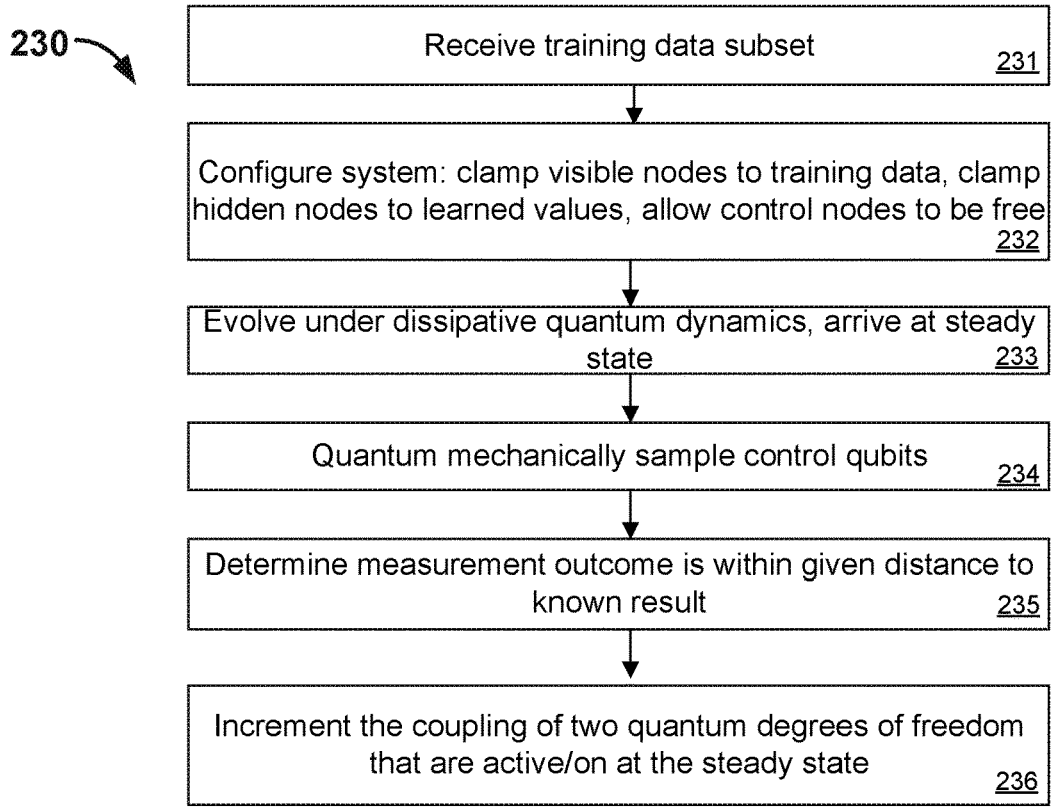
FIG. 2D is a flow diagram of an example learning process for training the control nodes of a QSM with weak plasticity.

FIG. 2D shows a flow diagram of an example learning process 230 for training the control nodes of a QSM with weak plasticity. The process is described as being performed by a classical processor, such as a classical computer, or a quantum processor, or a combination thereof. For example, the quantum hardware 400 of FIG. 4A below can perform the process 230.

The quantum system receives a second subset of the training data provided to the system in step 201 with reference to FIG. 2A (step 231).

The quantum system configures the visible, hidden and control nodes (step 232). The visible input and output nodes are clamped to the training data, and the hidden nodes are clamped to the values learned during the hidden node training phase. The control nodes are unclamped and are allowed to adjust themselves to satisfy the data structure given their environmental interactions and arrive at the steady state, which was not achieved in the hidden node learning phase.

The quantum system allows the configured quantum state to evolve under the action of a linear quantum dynamical map induced by a Hamiltonian of the visible, hidden and QG nodes and their interactions with the thermal bath (step 233). The total Hamiltonian for the QSM interacting with the thermal bath may be given by equation (2) above. In general, the Hamiltonian of the QSM, thermal bath and their interactions can be time-dependent. The evolution of the quantum state of the QSM may be given by equation (3) above. The effective dynamics for the QSM can be expressed as a quantum trace-preserving dynamical map, given by equation (4) above.

After a finite mixing time, the quantum state arrives at a desired attracting steady state $\rho_{ss}$. As described above in relation to step 108 of FIG. 1 by construction the QSM has a unique attracting steady state $\rho_{ss}$ that can always be reached asymptotically as $$\lim_{T \to \infty} \|M_T(\rho_{VHG}) - \rho_{ss}\|_1 = 0; \forall \rho_{vhg} \in H_{QSM}.$$

The quantum system quantum mechanically samples the control nodes (step 234). A quantum measurement, in its most general form given by a positive operator valued measurement (POVM), may be performed on the unique attracting steady state.

The quantum system may determine that the measurement outcome is within a given distance to the known result (step 235). The measurement outcomes may be post-processed and tested using statistical techniques and measures such as Chi-squared test and relative entropy. For example, the desired accuracy of the measurement outcome may be verified.

The quantum system increments the coupling of two Quantum Governor degrees of freedom that are active, or on, at the steady state (step 236).

Figure 2E:
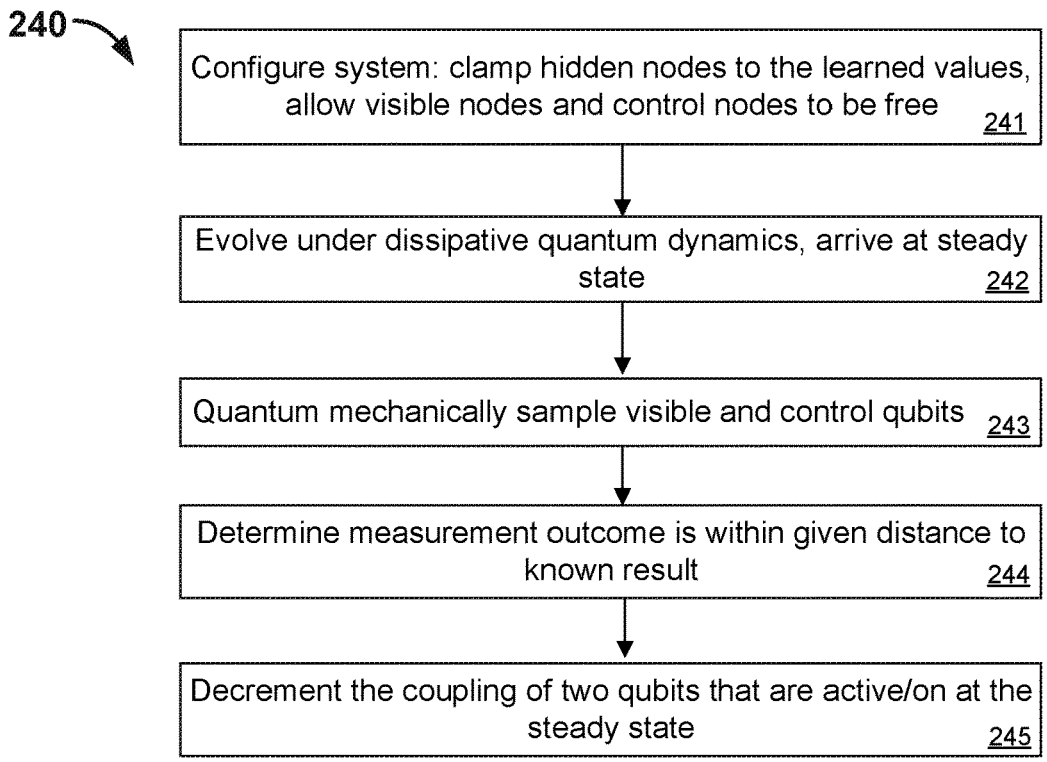
FIG. 2E is a flow diagram of an example unlearning process for training the control nodes of a QSM with weak plasticity.

FIG. 2E shows a flow diagram of an example unlearning process 240 for training the hidden nodes of a QSM with weak plasticity. The process is described as being performed by a classical processor, such as a classical computer, or a quantum processor, or a combination thereof. For example, the quantum hardware 400 of FIG. 4A below can perform the process 240.

The quantum system configures the visible, hidden and control nodes (step 241). The visible input and output nodes and the control nodes are unclamped and are allowed to adjust themselves to satisfy the data structure given their environmental interactions. The hidden nodes are clamped to the values learned during the hidden node training phase.

The quantum system allows the configured quantum state to evolve under the action of a linear quantum dynamical map induced by a Hamiltonian of the visible, hidden and QG nodes and their interactions with the thermal bath (step 242). The total Hamiltonian for the QSM interacting with the thermal bath may be given by equation (2) above. In general, the Hamiltonian of the QSM, thermal bath and their interactions can be time-dependent. The evolution of the quantum state of the QSM may be given by equation (3) above. The effective dynamics for the QSM can be expressed as a quantum trace-preserving dynamical map, given by equation (4) above.

After a finite mixing time, the quantum state arrives at a desired attracting steady state $\rho_{ss}$. As described above in relation to step 108 of FIG. 1 by construction the QSM has a unique attracting steady state $\rho_{ss}$ that can always be reached asymptotically as $$\lim_{T \to \infty} \|M_T(\rho_{VHG}) - \rho_{ss}\|_1 = 0; \forall \rho_{vhg} \in H_{QSM}.$$

The quantum system quantum mechanically samples the visible input and output and control nodes (step 243). A quantum measurement, in its most general form given by a positive operator valued measurement (POVM), may be performed on the unique attracting steady state.

The quantum system may determine that the measurement outcome is within a given distance to the known result (step 244). The measurement outcomes may be post-processed and tested using statistical techniques and measures such as Chi-squared test and relative entropy. For example, the desired accuracy of the measurement outcome may be verified.

The quantum system decrements the coupling of two quantum degrees of freedom that are active, or on, at the steady state (step 225).

The unlearning phase for the hidden node training leads to robustness with respect to both data noise (pollution in the data) and device noise.

The process 200 described above with reference to FIG. 2A, and therefore the sub-processes 210, 220, 230 and 240 described above with reference to FIGS. 2B, 2C, 2D and 2E respectively, leads to a form of weak plasticity, since the hardware can adjust itself to adapt with new environmental conditions or new problem instances not previously encountered in the previous training data set. The above adjustments and their consequential fine-tuned capability are facilitated via the QG degrees of freedom when the QG degrees of freedom settle down in a specific configuration in the steady state of the overall system at second learning and unlearning phase and can be improved overall through several iterations of the algorithm. The auxiliary degrees of freedoms of the QG essentially help with the generalization of data beyond what typical hidden nodes are assigned to do by essentially changing the architecture of the information processor to adopt to new conditions and data classes.

In some implementations, it may be possible to achieve strong plasticity by enhancing the role of the QG nodes to determine all the inter- and intra-couplings among all visible and hidden qubits.

Figure 3A:
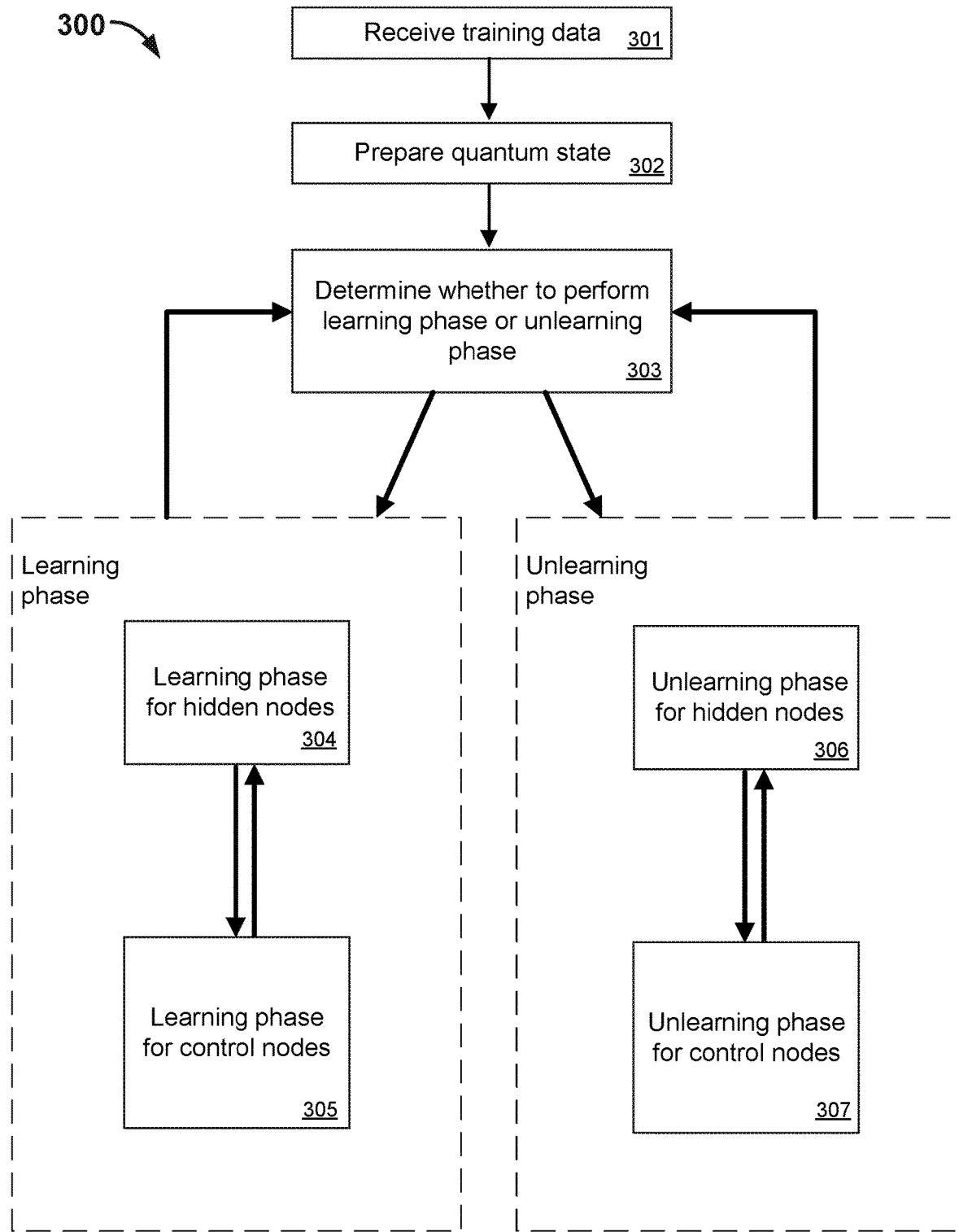
FIG. 3A is a flow diagram of an example process for training the QSM with strong plasticity to obtain a solution to a hard optimization or inference task.

FIG. 3A shows a flow diagram of an example process 300 for training the QSM with strong plasticity to obtain a solution to a hard optimization or inference task. The process is described as being performed by a classical processor, such as a classical computer, or a quantum processor, or a combination thereof. For example, the quantum hardware 401 of FIG. 4B below can perform the process 300.

The process 300 can be considered a self-organized procedure which includes two separate iterative phases of learning and unlearning for training the hidden nodes and control nodes, wherein each iterative phase consists of a first learning phase and a second learning phase for the hidden nodes and control nodes, or a first unlearning phase and a second unlearning phase for the hidden nodes and control nodes. The states of the input quantum nodes, output quantum nodes, hidden quantum nodes and control quantum nodes during a learning phase and an unlearning phase are detailed in FIGS. 3B and 3C, and described in the following table.

|  | First phase | Second phase |
|---|---|---|
| Learning | 1<br>Input/output nodes:<br>CLAMPED<br>Hidden nodes: | 2<br>Input/output nodes:<br>CLAMPED<br>Hidden nodes: |

-continued

|  | First phase | Second phase |
|---|---|---|
| Unlearning | UNCLAMPED<br>Control nodes:<br>CLAMPED<br>3<br>Input/output nodes:<br>UNCLAMPED<br>Hidden nodes:<br>UNCLAMPED<br>Control nodes:<br>CLAMPED | CLAMPED<br>Control nodes:<br>UNCLAMPED<br>4<br>Input/output nodes:<br>UNCLAMPED<br>Hidden nodes:<br>CLAMPED<br>Control nodes:<br>UNCLAMPED |

The quantum system receives training data (step 301). The training data includes input training data and output training data. In some implementations the training data may be some known probability distribution of input data. The QSM may be exposed to the training data in order to learn how to predict the statistical behavior of additional patterns not included in the training data.

The quantum system is prepared in a random quantum state (step 302) comprising the tensor product of a QSM density operator and thermal bath degrees of freedom as given by equation (1) above. In equation (1), $\rho_{VHG}(0)$ is a random state of visible v, hidden h and control g nodes and $\rho_B(0)$ is a thermal state of the thermal bath at the initial time. In some implementations, $\rho_{VHG}(0)$ is an entangled state. At state preparation the control nodes and their interactions with the data nodes are prepared with default settings and the thermal bath may be uncontrollable.

In some implementations, the control nodes are Quantum Governor (QG) nodes. The QG nodes represent the set of all non-information bearing quantum degrees of freedom and manage the interaction of the information bearing degrees of freedom with the thermal bath. For a time-independent Hamiltonian, using QG nodes as control nodes increases the interaction between the QSM system and bath in a controlled fashion to create robust steady states and reduce the required mixing time. For a time-dependent Hamiltonian, using QG nodes as control nodes may be further considered an error-correction strategy. The QG nodes enable the performance of dissipative quantum engineering without bath engineering. For strong plasticity, the QG nodes act as couplers for all types of data qubits-both visible and hidden.

The QSM training process may be an iterative process including two separate processes of learning and unlearning for training the hidden nodes and control nodes. The quantum system therefore determines whether to enter a learning phase or an unlearning phase (step 303). In some implementations the quantum system may enter an unlearning phase if the previous iteration included a learning phase, and may enter a learning phase if the previous iteration included an unlearning phase. For clarity, the process 300 will be described below as first determining to enter a learning phase at step 303.

The quantum system enters a learning phase wherein the hidden nodes and control nodes of the QSM are trained to iteratively capture high-level dependencies between the system variables for all or a subset of the received set of training data. During the learning phase the visible input and output nodes are clamped to the training data.

Upon determining to enter a hidden node training phase at step 303, the system enters a first learning phase for the hidden nodes and the quantum system performs a first learning process for the hidden nodes (step 304). The first learning process for training the hidden nodes is described in more detail with reference to FIG. 3B below.

The quantum system enters a second learning phase for the control nodes and the quantum system performs a second learning process for the control nodes (step 305). The second learning process for training the control nodes is described in more detail with reference to FIG. 3B below.

The quantum system may perform one or more iterations of the first and second learning processes for the hidden nodes and control nodes (steps 304 and 305) for temporary training of the hidden and control nodes. After temporary training of the hidden and control nodes, the system may determine to enter an unlearning training phase at step 303.

The quantum system enters an unlearning phase. During the unlearning phase the visible input and output nodes are unclamped and are allowed to adjust themselves to satisfy the data structure given their environmental interactions.

Upon determining to enter an unlearning phase at step 303, the system enters a first unlearning phase for the hidden nodes and the quantum system performs a first unlearning process for the hidden nodes (step 306). The first unlearning process for training the hidden nodes is described in more detail with reference to FIG. 3C below.

The quantum system performs a second unlearning process for the control nodes (step 307). The second unlearning process for training control nodes is described in more detail with reference to FIG. 3C below.

The quantum system may perform one or more iterations of the first and second unlearning processes (steps 306 and 307) for training the hidden nodes and control nodes. After temporary training of the control nodes, the system may determine to enter a hidden node training phase at step 203.

The process 300 for training the QSM with strong plasticity can be performed iteratively to improve the performance of the QSM. The process 300 may terminate when the quantum system has exhausted its training data resources. For example, when sampling from a probability distribution function (PDF), the process may terminate when the sampled PDF obtained may be determined to be within a given distance to the ideal PDF using a standard measure, such as a Chi-square divergence or relative entropy.

Figure 3B:
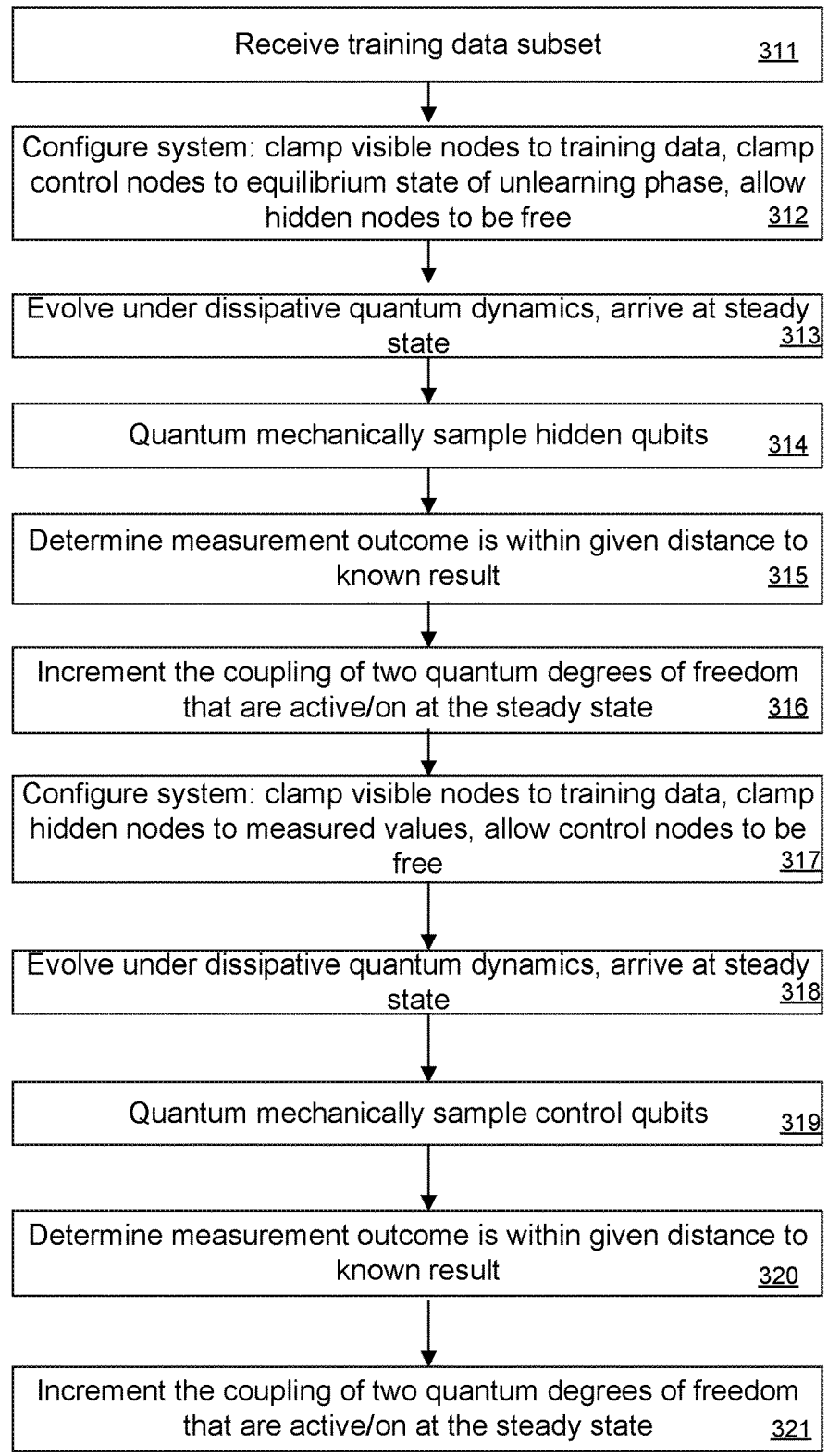
FIG. 3B is a flow diagram of an example learning process for training the nodes of a QSM with strong plasticity.

FIG. 3B shows a flow diagram of an example learning process 310 for training the nodes of a QSM with strong plasticity. The process is described as being performed by a classical system, such as a classical processor, or a quantum processor, or a combination thereof. For example, the quantum hardware 401 of FIG. 4B below can perform the process 310.

The quantum system receives a subset of the training data provided to the system in step 301 with reference to FIG. 3A (step 311).

The quantum system enters the first learning phase and configures the visible, hidden and control nodes (step 312). The visible input and output nodes are clamped to the subset of training data, whilst the hidden nodes are unclamped and are allowed to adjust themselves to satisfy the data structure given their environmental interactions. The control node couplings are clamped to some default values or the equilibrium state of a previous unlearning phase.

The quantum system allows the configured quantum state to evolve under the action of a linear quantum dynamical map induced by a Hamiltonian of the visible, hidden and QG nodes and their interactions with the thermal bath (step 313). The total Hamiltonian for the QSM interacting with the thermal bath may be given by equation (2) above. In general, the Hamiltonian of the QSM, thermal bath and their interactions can be time-dependent. The evolution of the quantum state of the QSM may be given by equation (3) above. The effective dynamics for the QSM can be expressed as a quantum trace-preserving dynamical map, given by equation (4) above.

After a finite mixing time, the quantum state arrives at a desired attracting steady state $\rho_{ss}$. As described above in relation to step 108 of FIG. 1 by construction the QSM has a unique attracting steady state $\rho_{ss}$ that can always be reached asymptotically as $$\lim_{T \to \infty} \|M_T(\rho_{VHG}) - \rho_{ss}\|_1 = 0; \forall \rho_{vhg} \in H_{QSM}.$$

The quantum system quantum mechanically samples the hidden nodes (step 314). A quantum measurement, in its most general form given by a positive operator valued measurement (POVM), may be performed on the unique attracting steady state. After quantum measurement at the steady state, the system obtains a bit string configuration for the hidden nodes, which will be used in the second learning phase.

The quantum system may determine that the measurement outcome is within a given distance to the known result (step 315). The measurement outcomes may be post-processed and tested using statistical techniques and measures such as Chi-squared test and relative entropy. For example, the desired accuracy of the measurement outcome may be verified.

The quantum system increments the coupling of two quantum degrees of freedom that are active, or on, at the steady state (step 316).

The quantum system enters the second learning phase and configures the visible, hidden and control nodes (step 317). The visible input and output nodes are clamped to the training data, the hidden nodes are clamped to the measured values from the first learning phase, and the control nodes are allowed to adjust themselves to satisfy the data structure given their environmental interactions.

The quantum system allows the configured quantum state to evolve under the action of a linear quantum dynamical map induced by a Hamiltonian of the visible, hidden and QG nodes and their interactions with the thermal bath (step 318). The total Hamiltonian for the QSM interacting with the thermal bath may be given by equation (2) above. In general, the Hamiltonian of the QSM, thermal bath and their interactions can be time-dependent. The evolution of the quantum state of the QSM may be given by equation (3) above. The effective dynamics for the QSM can be expressed as a quantum trace-preserving dynamical map, given by equation (4) above.

After a finite mixing time, the quantum state arrives at a desired attracting steady state $\rho_{ss}$. As described above in relation to step 108 of FIG. 1 by construction the QSM has a unique attracting steady state $\rho_{ss}$ that can always be reached asymptotically as $$\lim_{T \to \infty} \|M_T(\rho_{VHG}) - \rho_{ss}\|_1 = 0; \forall \rho_{vhg} \in H_{QSM}.$$

The quantum system quantum mechanically samples the control nodes (step 319). A quantum measurement, in its most general form given by a positive operator valued measurement (POVM), may be performed on the unique attracting steady state.

The quantum system may determine that the measurement outcome is within a given distance to the known result (step 320). The measurement outcomes may be post-processed and tested using statistical techniques and measures such as Chi-squared test and relative entropy. For example, the desired accuracy of the measurement outcome may be verified.

The quantum system increments the coupling of two quantum degrees of freedom that are active, or on, at the steady state (step 321).

Figure 3C:
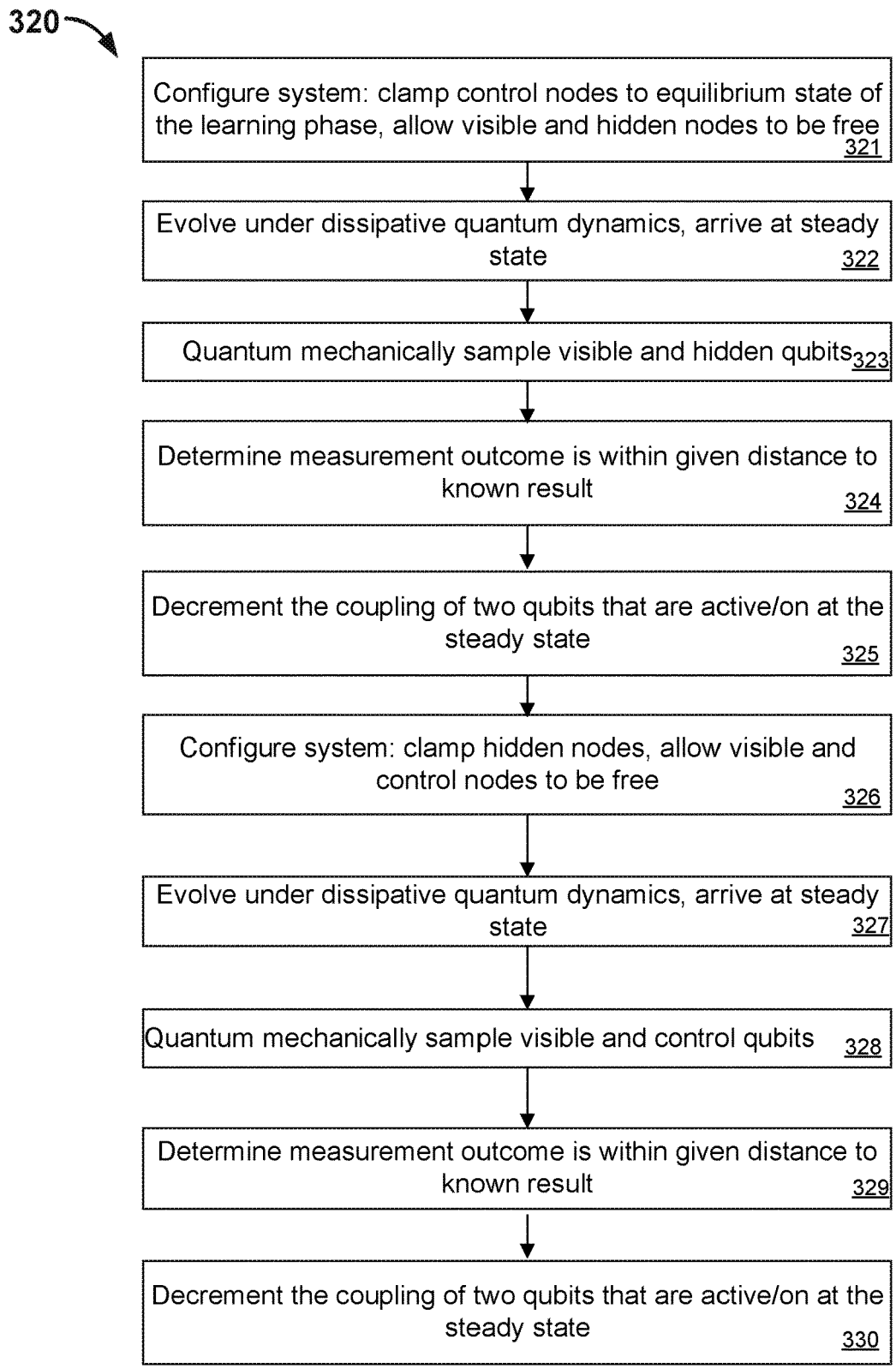
FIG. 3C is a flow diagram of an example unlearning process for training the nodes of a QSM with strong plasticity.

FIG. 3C shows a flow diagram of an example unlearning process 320 for training the nodes of a QSM with strong plasticity. The process is described as being performed by a classical processor, such as a classical computer, or a quantum processor, or a combination thereof. For example, the quantum hardware 401 of FIG. 4B below can perform the process 320.

The quantum system enters the first unlearning phase and configures the visible, hidden and control nodes (step 321). The visible input and output nodes and the hidden nodes are unclamped and are allowed to adjust themselves to satisfy the data structure given their environmental interactions. The control node couplings are clamped to some default values or the equilibrium state of a previous learning phase.

The quantum system allows the configured quantum state to evolve under the action of a linear quantum dynamical map induced by a Hamiltonian of the visible, hidden and QG nodes and their interactions with the thermal bath (step 322). The total Hamiltonian for the QSM interacting with the thermal bath may be given by equation (2) above. In general, the Hamiltonian of the QSM, thermal bath and their interactions can be time-dependent. The evolution of the quantum state of the QSM may be given by equation (3) above. The effective dynamics for the QSM can be expressed as a quantum trace-preserving dynamical map, given by equation (4) above.

After a finite mixing time, the quantum state arrives at a desired attracting steady state $\rho_{ss}$. As described above in relation to step 108 of FIG. 1 by construction the QSM has a unique attracting steady state $\rho_{ss}$ that can always be reached asymptotically as $$\lim_{T \to \infty} \|M_T(\rho_{VHG}) - \rho_{ss}\|_1 = 0; \forall \rho_{vhg} \in H_{QSM}.$$

The quantum system quantum mechanically samples the hidden and visible nodes (step 323). A quantum measurement, in its most general form given by a positive operator valued measurement (POVM), may be performed on the unique attracting steady state. After quantum measurement at the steady state, the system obtains a bit string configuration for the hidden nodes, which will be used in the second learning phase.

The quantum system may determine that the measurement outcome is within a given distance to the known result (step 324). The measurement outcomes may be post-processed and tested using statistical techniques and measures such as Chi-squared test and relative entropy. For example, the desired accuracy of the measurement outcome may be verified.

The quantum system decrements the coupling of two quantum degrees of freedom that are active, or on, at the steady state (step 325).

The quantum system enters the second unlearning phase and configures the visible, hidden and control nodes (step 326). The visible input and output nodes and the control nodes are allowed to adjust themselves to satisfy the data structure given their environmental interactions. The hidden nodes are clamped to the previous steady state.

The quantum system allows the configured quantum state to evolve under the action of a linear quantum dynamical map induced by a Hamiltonian of the visible, hidden and QG nodes and their interactions with the thermal bath (step 327). The total Hamiltonian for the QSM interacting with the thermal bath may be given by equation (2) above. In general, the Hamiltonian of the QSM, thermal bath and their interactions can be time-dependent. The evolution of the quantum state of the QSM may be given by equation (3) above. The effective dynamics for the QSM can be expressed as a quantum trace-preserving dynamical map, given by equation (4) above.

After a finite mixing time, the quantum state arrives at a desired attracting steady state $\rho_{ss}$. As described above in relation to step 108 of FIG. 1 by construction the QSM has a unique attracting steady state $\rho_{ss}$ that can always be reached asymptotically as $$\lim_{T \to \infty} \|M_T(\rho_{VHG}) - \rho_{ss}\|_1 = 0; \forall \rho_{vhg} \in H_{QSM}.$$

The quantum system quantum mechanically samples the visible and control nodes (step 328). A quantum measurement, in its most general form given by a positive operator valued measurement (POVM), may be performed on the unique attracting steady state.

The quantum system may determine that the measurement outcome is within a given distance to the known result (step 329). The measurement outcomes may be post-processed and tested using statistical techniques and measures such as Chi-squared test and relative entropy. For example, the desired accuracy of the measurement outcome may be verified.

The quantum system decrements the coupling of two quantum degrees of freedom that are active, or on, at the steady state (step 330).

The unlearning phase 320 prevents over fitting and can be considered analogous to negative contributions in the contrastive divergence method widely used in classical deep learning algorithms.

Example Quantum Hardware

FIG. 4 is a schematic diagram of two example quantum processors 400 and 401 for the QSM with weak and strong quantum plasticity, respectively. The two schematic diagrams are based on superconducting qubits within the Chimera graph connectivity. The quantum plasticity achieved by the processors is inspired by biological neural networks, such as those in the neocortex which are known to be plastic yet are widely believed to operate according to classical laws of physics. The quantum plasticity can also be considered as biologically inspired post-von Neumann architectures known as Neuromorphic Computing architectures that could in principle become plastic and absolutely rely on classical laws of physics as they are CMOS-based transistors.

Figure 4A:
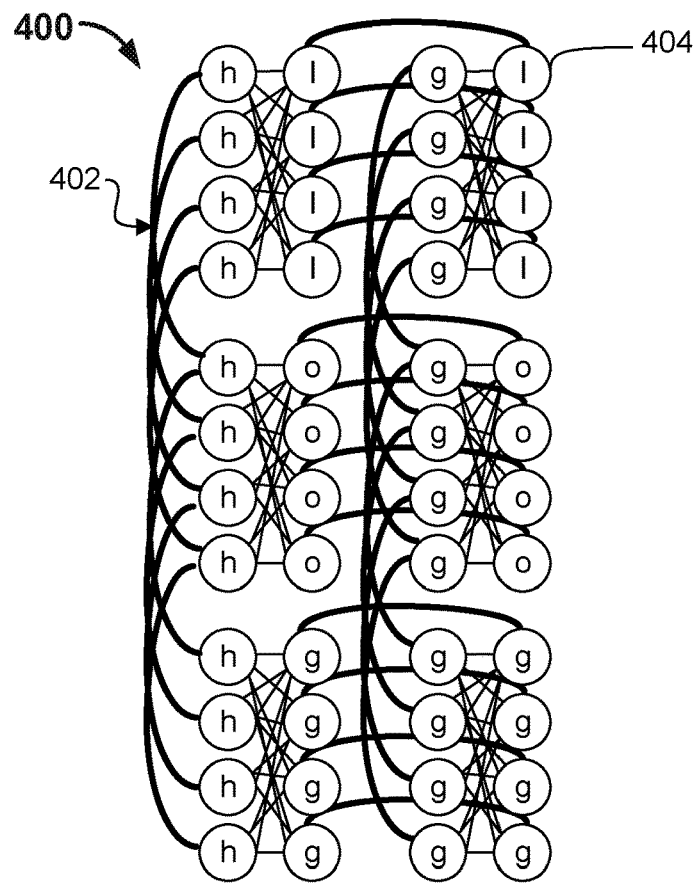
FIG. 4A is a schematic diagram of an example quantum processor 400 for the QSM with weak plasticity based on superconducting qubits within the Chimera graph connectivity.

FIG. 4A is a schematic diagram of an example quantum processor 400 for the QSM with weak plasticity based on superconducting qubits within the Chimera graph connectivity. The processor includes sixteen qubits 404, represented by 2 by 3 unit cells 402. The qubits are connected by programmable inductive couplers as shown by lines connecting different qubits. Each line may represent one or multiple couplers between a pair of qubits. The inter-cell connections can be ferromagnetic (+1). The intra-cell connections can be arbitrary. The size of the processor implementing the QSM may be scalable by increasing the number of qubits. For example, the processor can also include a larger number of qubits represented by a larger number of unit cells, e.g., 4 by 6 or more.

The qubits in the processor represent different classes of degrees of freedom and play different roles in the computation. The qubits labeled i represent input qubits. In this example, quantum processor 400 has four input qubits. The qubits labeled h are hidden qubits. In this example, quantum processor 400 has four hidden qubits. The qubits labeled o are output qubits. In this example, quantum processor 400 has four output qubits. The qubits labeled g are control qubits. In some implementations the control qubits are Quantum Governor qubits. In this example, quantum processor 400 has four Quantum Governor qubits. The input, hidden and output qubits labeled i, h and o represent information bearing degrees of freedom and are logical qubits for use in computations carried out by the quantum processor. The qubits labeled g represent non-information bearing degrees of freedom and are control qubits that are programmed to perform the function of Quantum Governor qubits. The control qubits do not participate in the computations for which the logical qubits are configured.

The processor may be constructed such that the Quantum Governor qubits manipulate the interactions between data, that is the input and output, qubits and hidden qubits, whilst still allowing for direct interactions between data qubits and hidden qubits. This results in weak quantum plasticity, which provides partial robustness with respect to environmental conditions, control interactions as well as label noise.

Figure 4B:
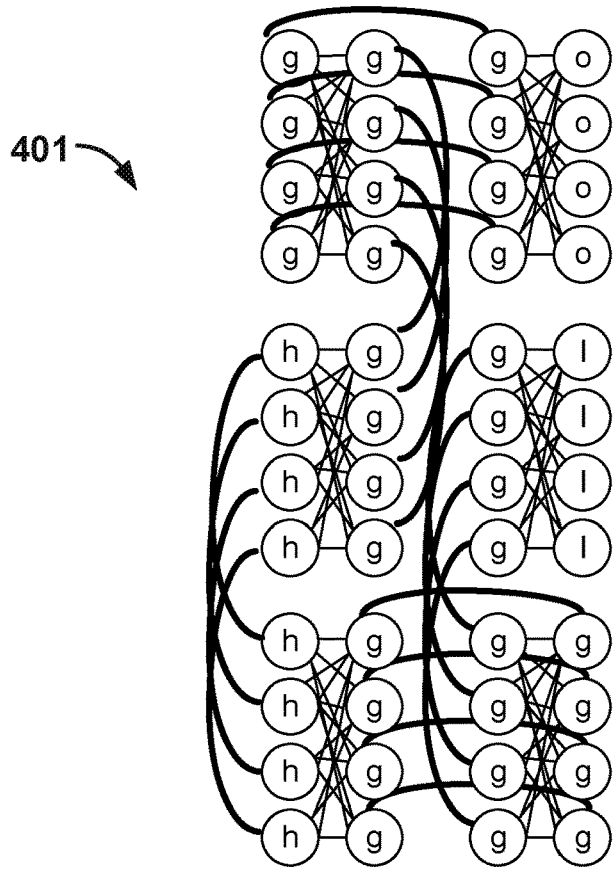
FIG. 4B is a schematic diagram of an example quantum processor 401 for the QSM with strong plasticity based on superconducting qubits within the Chimera graph connectivity.

FIG. 4B is a schematic diagram of an example quantum processor 401 for the QSM with strong plasticity based on superconducting qubits within the Chimera graph connectivity. The processor includes twenty qubits 404, represented by 2 by 3 unit cells 402. The qubits are connected by programmable inductive couplers as shown by lines connecting different qubits. Each line may represent one or multiple couplers between a pair of qubits. The inter-cell connections can be ferromagnetic (+1). The intra-cell connections can be arbitrary. The size of the processor implementing the QSM may be scalable by increasing the number of qubits. For example, the processor can also include a larger number of qubits represented by a larger number of unit cells, e.g., 4 by 6 or more.

The qubits in the processor represent different classes of degrees of freedom and play different roles in the computation. The qubits labeled i represent input qubits. In this example, quantum processor 401 has four input qubits. The qubits labeled h are hidden qubits. In this example, quantum processor 401 has four hidden qubits. The qubits labeled o are output qubits. In this example, quantum processor 401 has four output qubits. The qubits labeled g are Quantum Governor qubits. In this example, quantum processor 401 has eight fully connected Quantum Governor qubits. The qubits labeled i, h and o are logical qubits for use in computations carried out by the quantum processor. The qubits labeled g are control qubits that are programmed to perform the function of Quantum Governor qubits. The control qubits do not participate in the computations for which the logical qubits are configured. The layers of the QSM are restricted such that there are no interactions amongst data qubits or hidden qubits.

The processor may be constructed such that the Quantum Governor qubits completely determine the interactions between data and hidden nodes, without allowing for direct interactions between input and hidden nodes. This results in strong plasticity, providing an efficient learning model to achieve robustness with respect to environmental conditions, control interactions as well as label noise.

In some implementations, the logical qubits and the control qubits in both quantum processors 400 and 401 have the same construction. In other implementations, the control qubits have simpler or less precise structures than the logical qubits.

FIG. 5 is a schematic diagram showing two one-dimensional chains of qubits in a quantum processor for performing quantum inference processes to achieve strong quantum plasticity. The one-dimensional chains of qubits can represent two realizations of the quantum processor 4401 of FIG. 4B.

FIG. 5A is a schematic diagram showing a one-dimensional chain of qubits in a quantum processor for performing a quantum inference process with strong quantum plasticity without introducing auxiliary qubits. In this example, the quantum processor consists of a one-dimensional chain 502 of dual-purpose superconducting control and logical qubits 504. The qubits are numbered sequentially, and those numbered with odd numbers represent the logical qubits, whilst those numbered with even numbers represent the control qubits, or coupler qubits. In some implementations the coupler qubits may be Quantum Governor Type I qubits. The logical qubits are either data qubits or hidden qubits which in this example for simplicity we assume there are equally distributed. In other words, each even numbered control qubit connecting two odd numbered logical qubits, the one on the left is labeled as visible, and the one on the right is labeled as a hidden qubit.

In this example, the quantum learning procedure may be an iterative process between four phases including two learning phases and two unlearning phases. In the first learning phase, the odd numbered qubits, that is the logical qubits, are clamped to input and output data and the control qubits are clamped in some random state, as described above with reference to FIG. 3B. In the second learning phase the quantum system will clamp the hidden qubits to their steady state values, keep the visible qubits still fixed, and allow the even numbered coupler qubits are to adjust themselves to satisfy the particular input/output data structure, as described above with reference to FIG. 3B. Essentially, this phase can be envisioned as a physical enforcement of the Hebbian learning rule that states that the nodes that fire together are wired together. In the first unlearning phase, the control nodes are fixed and the visible nodes are not clamped. The processor may be allowed to arrive at a new steady state given the initial state and other factors such as environmental interactions. The hidden qubits are then fixed and the control and visible qubits are allowed to reconfigure themselves to a new equilibrium. The above four phases may be repeated for all training data. In some implementations, the quantum system may be sampling from a probability distribution function (PDF). In such implementations the algorithm will terminate when determining the sampled PDF obtained form measurement outcome is within a given distance to the ideal PDF.

The unlearning phases may be considered in analogy with negative terms in a contrastive divergence method that is widely used in conventional deep learning algorithms. The unlearning phase prevents over fitting. The quantum inference algorithm has many advantages, for example the algorithm avoids the extremely hard computation of gradient of log-likelihood function which is of complexity #P.

FIG. 5B is a schematic diagram showing a one-dimensional chain of qubits in a quantum processor for performing a quantum inference process with strong quantum plasticity. In this example, the quantum processor consists of a one-dimensional chain 506 of superconducting logical qubits 510 and control qubits 508. The algorithm and architecture is similar to that of FIG. 5A, with the exception that here the logical and control qubits are act as pure qubits and not as couplers, and have independent tensor product structure and interact with each other through traditional couplers such as mutual inductance for superconducting flux qubits. In some implementations the coupler qubits may be Quantum Governor Type II qubits. Here, the strong quantum plasticity may be explicitly encoded into the adaptive states of the control qubits upon reaching the unique attracting steady state. The state of the control qubits determines the interaction of the logical qubits at an equilibrium or non-equilibrium steady state, given some fixed interactions between the logical qubits and the control qubits.

Figure 6A:
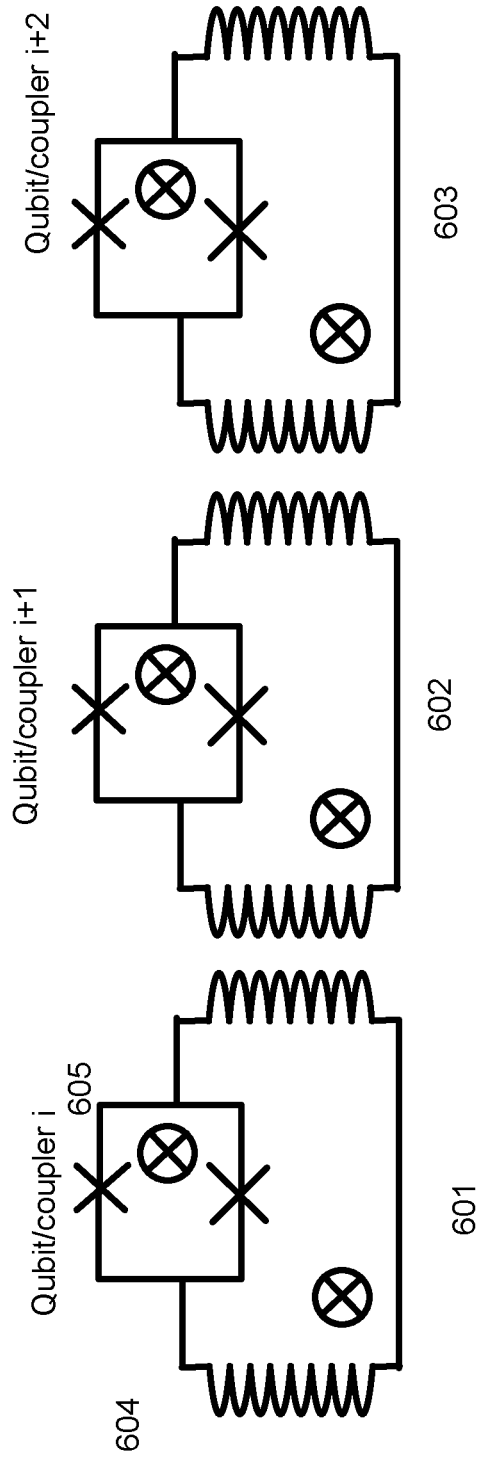
FIG. 6A is a schematic diagram showing the structures and interactions of three qubits in a quantum processor.
Figure 6B:
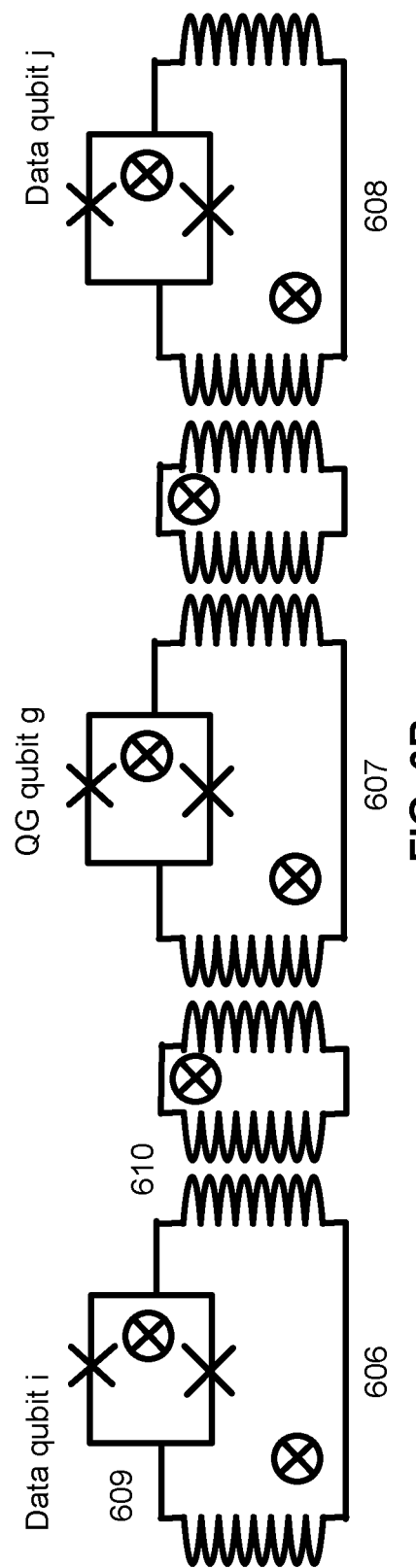
FIG. 6B is a schematic diagram showing the structures and interactions of three qubits in a quantum processor.

FIG. 6 shows two example layouts of coupled qubits for constructing strong quantum plasticity in one dimension. FIG. 6A and FIG. 6B provide example layouts for coupled qubits for the schematic diagrams of FIG. 6A and FIG. 6B respectively.

FIG. 6A shows an example sequence of three coupled qubits 601, 602 and 603 in the same quantum processor, for example quantum processor 400 of FIG. 4A. The qubits 601, 602 and 603 can correspond to three logical qubits, three control qubits or any combination of logical and control qubits. In this example, each qubit may be a superconducting qubit and includes a Josephson box 504. Each Josephson box can include a Josephson junction 605 connected to a capacitance. The sequence of coupled qubits may also include a larger number of coupled qubits. The qubits are subject to an external magnetic field B applied along a $e_3$ direction perpendicular to the surface of the paper on which the figure is shown; the B field is labeled by the symbol ⊗.

In some implementations, the control qubits are Quantum Governor Type I qubits. The logical qubits can be constructed with a higher precision than the control qubits. The less precisely constructed control qubits may then perform the function of a Quantum Governor qubit at a reduced cost. In other implementations, a control qubit can be constructed using structures other than a Josephson box, such as a quantum harmonic oscillator.

FIG. 6B shows an example sequence of three coupled qubits 606, 607 and 608 in the same quantum processor, for example quantum processor 401 of FIG. 4B. The qubits 606 and 608 are logical qubits for use in computations carried out by the quantum processor. Qubit 607 may be a control qubit. Each qubit 606, 607 and 608 may be a superconducting qubit and includes a Josephson box 609. Each Josephson box can include a Josephson junction 610. The sequence of qubits may also include a larger number of coupled qubits. The larger number of coupled qubits would sequentially alternate between control qubits and logical qubits. The qubits are subject to an external magnetic field B applied along a $e_3$ direction perpendicular to the surface of the paper on which the figure is shown; the B field is labeled by the symbol ⊗. A set of inductive couplers are laced between the qubits such that the qubits are coupled along the $e_3$-$e_3$ directions.

In some implementations, the control qubits are Quantum Governor Type II qubits. The logical qubits can be constructed with a higher precision than the control qubits. The less precisely constructed control qubits may then perform the function of a Quantum Governor qubit at a reduced cost.

In other implementations, a control qubit can be constructed using structures other than a Josephson box, such as a quantum harmonic oscillator.

Implementations of the digital and/or quantum subject matter and the digital functional operations and quantum operations described in this specification can be implemented in digital electronic circuitry, suitable quantum circuitry or, more generally, quantum computational systems, in tangibly-embodied digital and/or quantum computer software or firmware, in digital and/or quantum computer hardware, including the structures disclosed in this specification and their structural equivalents, or in combinations of one or more of them. The term "quantum computational systems" may include, but is not limited to, quantum computers, quantum information processing systems, quantum cryptography systems, or quantum simulators.

Implementations of the digital and/or quantum subject matter described in this specification can be implemented as one or more digital and/or quantum computer programs, i.e., one or more modules of digital and/or quantum computer program instructions encoded on a tangible non-transitory storage medium for execution by, or to control the operation of, data processing apparatus. The digital and/or quantum computer storage medium can be a machine-readable storage device, a machine-readable storage substrate, a random or serial access memory device, one or more qubits, or a combination of one or more of them. Alternatively or in addition, the program instructions can be encoded on an artificially-generated propagated signal that is capable of encoding digital and/or quantum information, e.g., a machine-generated electrical, optical, or electromagnetic signal, that is generated to encode digital and/or quantum information for transmission to suitable receiver apparatus for execution by a data processing apparatus.

The terms quantum information and quantum data refer to information or data that is carried by, held or stored in quantum systems, where the smallest non-trivial system is a qubit, i.e., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states are possible. The term "data processing apparatus" refers to digital and/or quantum data processing hardware and encompasses all kinds of apparatus, devices, and machines for processing digital and/or quantum data, including by way of example a programmable digital processor, a programmable quantum processor, a digital computer, a quantum computer, multiple digital and quantum processors or computers, and combinations thereof. The apparatus can also be, or further include, special purpose logic circuitry, e.g., an FPGA (field programmable gate array), an ASIC (application-specific integrated circuit), or a quantum simulator, i.e., a quantum data processing apparatus that is designed to simulate or produce information about a specific quantum system. In particular, a quantum simulator is a special purpose quantum computer that does not have the capability to perform universal quantum computation. The apparatus can optionally include, in addition to hardware, code that creates an execution environment for digital and/or quantum computer programs, e.g., code that constitutes processor firmware, a protocol stack, a database management system, an operating system, or a combination of one or more of them.

A digital computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. A quantum computer program, which may also be referred to or described as a program, software, a software application, a module, a software module, a script, or code, can be written in any form of programming language, including compiled or interpreted languages, or declarative or procedural languages, and translated into a suitable quantum programming language, or can be written in a quantum programming language, e.g., QCL or Quipper.

A digital and/or quantum computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A digital and/or quantum computer program can be deployed to be executed on one digital or one quantum computer or on multiple digital and/or quantum computers that are located at one site or distributed across multiple sites and interconnected by a digital and/or quantum data communication network. A quantum data communication network is understood to be a network that may transmit quantum data using quantum systems, e.g. qubits. Generally, a digital data communication network cannot transmit quantum data, however a quantum data communication network may transmit both quantum data and digital data.

The processes and logic flows described in this specification can be performed by one or more programmable digital and/or quantum computers, operating with one or more digital and/or quantum processors, as appropriate, executing one or more digital and/or quantum computer programs to perform functions by operating on input digital and quantum data and generating output. The processes and logic flows can also be performed by, and apparatus can also be implemented as, special purpose logic circuitry, e.g., an FPGA or an ASIC, or a quantum simulator, or by a combination of special purpose logic circuitry or quantum simulators and one or more programmed digital and/or quantum computers.

For a system of one or more digital and/or quantum computers to be "configured to" perform particular operations or actions means that the system has installed on it software, firmware, hardware, or a combination of them that in operation cause the system to perform the operations or actions. For one or more digital and/or quantum computer programs to be configured to perform particular operations or actions means that the one or more programs include instructions that, when executed by digital and/or quantum data processing apparatus, cause the apparatus to perform the operations or actions. A quantum computer may receive instructions from a digital computer that, when executed by the quantum computing apparatus, cause the apparatus to perform the operations or actions.

Digital and/or quantum computers suitable for the execution of a digital and/or quantum computer program can be based on general or special purpose digital and/or quantum processors or both, or any other kind of central digital and/or quantum processing unit. Generally, a central digital and/or quantum processing unit will receive instructions and digital and/or quantum data from a read-only memory, a random access memory, or quantum systems suitable for transmitting quantum data, e.g. photons, or combinations thereof.

The essential elements of a digital and/or quantum computer are a central processing unit for performing or executing instructions and one or more memory devices for storing instructions and digital and/or quantum data. The central processing unit and the memory can be supplemented by, or incorporated in, special purpose logic circuitry or quantum simulators. Generally, a digital and/or quantum computer will also include, or be operatively coupled to receive digital and/or quantum data from or transfer digital and/or quantum data to, or both, one or more mass storage devices for storing digital and/or quantum data, e.g., magnetic, magneto-optical disks, optical disks, or quantum systems suitable for storing quantum information. However, a digital and/or quantum computer need not have such devices.

Digital and/or quantum computer-readable media suitable for storing digital and/or quantum computer program instructions and digital and/or quantum data include all forms of non-volatile digital and/or quantum memory, media and memory devices, including by way of example semiconductor memory devices, e.g., EPROM, EEPROM, and flash memory devices; magnetic disks, e.g., internal hard disks or removable disks; magneto-optical disks; CD-ROM and DVD-ROM disks; and quantum systems, e.g., trapped atoms or electrons. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Control of the various systems described in this specification, or portions of them, can be implemented in a digital and/or quantum computer program product that includes instructions that are stored on one or more non-transitory machine-readable storage media, and that are executable on one or more digital and/or quantum processing devices. The systems described in this specification, or portions of them, can each be implemented as an apparatus, method, or system that may include one or more digital and/or quantum processing devices and memory to store executable instructions to perform the operations described in this specification.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by a quantum processor, the method comprising:
    receiving data specifying a machine learning inference problem;
    preparing a quantum system in an initial quantum state, wherein the initial quantum state is a tensor product of i) an initial state of the quantum processor comprising a plurality of logical quantum nodes and control quantum nodes and ii) a state of an environment modelled by a thermal bath;
    evolving the initial quantum state under a dissipative quantum map until a steady state is reached, the steady state encoding a solution to the machine learning inference problem, wherein the dissipative quantum map comprises a map induced by a Hamiltonian of the logical quantum nodes, control quantum nodes, and interactions between the logical quantum nodes, control quantum nodes, and the bath; and
    performing a quantum measurement on the steady state to obtain a measurement outcome that represents an energy value of the steady state and that comprises the solution to the machine learning inference problem;
    wherein the interactions between the logical quantum nodes and the control quantum nodes comprise interactions that have been configured, through one or more hidden node training phases and control node training phases, to encode the solution to the machine learning inference problem in quantum statistics of the steady state, wherein during each hidden node training phase the control quantum nodes are set to a non-interacting state and learning and unlearning subphases of hidden quantum nodes included in the logical quantum nodes are iteratively changed.

2. The method of claim 1, wherein the hidden quantum nodes are set to an unclamped state during a learning subphase and an unlearning subphase.

3. The method of claim 1, wherein input and output quantum nodes included in the logical quantum nodes are set to a clamped state during the learning subphase and set to an unclamped state during the unlearning subphase.

4. The method of claim 3, wherein setting the input and output quantum nodes to the clamped state comprises clamping the input and output quantum nodes to training data.

5. The method of claim 1, wherein each control node training phase comprises:
    setting the control quantum nodes to an unclamped state; and iteratively changing learning and unlearning subphases of the control quantum nodes.

6. The method of claim 5, wherein hidden quantum nodes included in the logical quantum nodes are set to a clamped state during a learning subphase and an unlearning subphase.

7. The method of claim 6, wherein setting the hidden quantum nodes to the clamped state comprises clamping the hidden quantum nodes to learned values of a hidden node training phase.

8. The method of claim 5, wherein input and output quantum nodes included in the logical quantum nodes are set to a clamped state during a learning subphase and set to an unclamped state during an unlearning subphase.

9. The method of claim 8, wherein setting the input and output quantum nodes to the clamped state during the learning subphase comprises clamping the input and output quantum nodes to training data.

10. A method performed by a quantum processor, the method comprising:
receiving data specifying a machine learning inference problem;
preparing a quantum system in an arbitrary initial quantum state, wherein the initial quantum state is a tensor product of i) an initial state of the quantum processor comprising a plurality of logical quantum nodes and control quantum nodes and ii) a state of an environment modelled by a bath;
evolving the initial quantum state under a dissipative quantum map until a steady state is reached, the steady state encoding a solution to the machine learning inference problem, wherein the dissipative quantum map comprises a map induced by a Hamiltonian of the logical quantum nodes, control quantum nodes, and interactions between the logical quantum nodes, control quantum nodes, and the bath; and
performing a quantum measurement on the steady state to obtain a measurement outcome that represents an energy value of the steady state and that comprises the solution to the machine learning inference problem;
wherein the interactions between the logical quantum nodes and the control quantum nodes comprise interactions that have been configured, through one or more hidden node training phases and control node training phases, to encode the solution to the machine learning inference problem in quantum statistics of the steady state, wherein during each hidden node training phase the control quantum nodes are set to a non-interacting state and learning and unlearning subphases of hidden quantum nodes included in the logical quantum nodes are iteratively changed.

11. The method of claim 10, wherein the control quantum nodes are set to a clamped state during a first learning phase and are set to an unclamped state during a second learning phase.

12. The method of claim 10, wherein the control quantum nodes are set to a clamped state during a first unlearning phase and are set to an unclamped state during a second unlearning phase.

13. The method of claim 10, wherein hidden quantum nodes included in the logical quantum nodes are set to an unclamped state in a first learning phase and in a first unlearning phase.

14. The method of claim 10, wherein input and output quantum nodes included in the logical quantum nodes are set to a clamped state in a first learning phase and are set to an unclamped state in a first unlearning phase.

15. The method of claim 14, wherein setting the input and output quantum nodes to the clamped state in the first learning phase comprises clamping the input and output quantum nodes to training data.

16. The method of claim 10, wherein hidden quantum nodes included in the logical quantum nodes are set to a clamped state in a second learning phase and in a second unlearning phase.

17. The method of claim 10, wherein input and output quantum nodes included in the logical quantum nodes are set to a clamped state in a second learning phase and are set to an unclamped state in a second unlearning phase.

18. The method of claim 17, wherein setting the input and output quantum nodes to the clamped state for the second learning phase comprises clamping the input and output quantum nodes to training data.

19. The method of claim 10, wherein the control quantum nodes are clamped to an equilibrium state of a second learning phase or a second unlearning phase in subsequent learning or unlearning phases.

* * * * *